US010686860B2

(12) United States Patent
Feher et al.

(10) Patent No.: US 10,686,860 B2
(45) Date of Patent: Jun. 16, 2020

(54) SOFTWARE DEFINED CONTENT DELIVERY NETWORK FOR FLEXIBLE, REAL-TIME MANAGEMENT OF LARGE-SCALE DATA TRANSFERS

(71) Applicant: USTREAM, INC., San Francisco, CA (US)

(72) Inventors: Gyula A. Feher, Budapest (HU); Gergely Hodicska, Budapest (HU); Jozsef P. Kapusi, Budapest (HU); Arpad Kun, San Francisco, CA (US); Zoltan A. Nemeth, Budapest (HU); Gabor Nyerges, Budapest (HU); Peter Wilcsinszky, Budapest (HU)

( * ) Notice: Subject to any disclaimer, the term of this patent is extended or adjusted under 35 U.S.C. 154(b) by 222 days.

(21) Appl. No.: 15/525,752

(22) PCT Filed: Nov. 17, 2015

(86) PCT No.: PCT/US2015/061167
§ 371 (c)(1),
(2) Date: Oct. 9, 2017

(87) PCT Pub. No.: WO2016/081506
PCT Pub. Date: May 26, 2016

(65) Prior Publication Data
US 2017/0366595 A1    Dec. 21, 2017

Related U.S. Application Data

(60) Provisional application No. 62/081,490, filed on Nov. 18, 2014.

(51) Int. Cl.
*G06F 15/173* (2006.01)
*H04L 29/06* (2006.01)
(Continued)

(52) U.S. Cl.
CPC .............. *H04L 65/80* (2013.01); *H04L 12/00* (2013.01); *H04L 12/6418* (2013.01);
(Continued)

(58) Field of Classification Search
CPC ...... H04L 65/80; H04L 12/00; H04L 12/6418
(Continued)

(56) References Cited

U.S. PATENT DOCUMENTS 8,489,923 B1 *   7/2013  Lakshminarayanan ......................
                                              H04N 21/2662
                                                    714/26
8,738,766 B1 *   5/2014  Kazerani ................. H04L 45/70
                                                    709/224

(Continued)

FOREIGN PATENT DOCUMENTS

WO      WO2016081506         5/2016

*Primary Examiner* — Duyen M Doan
(74) *Attorney, Agent, or Firm* — Schmeiser, Olsen & Watts, LLP; Mark Vallone

(57) ABSTRACT

A method and an associated SDCDN device for delivering data content in a communication network. A software defined content delivery network (SDCDN) monitors one or more performance indicators regarding an exchange of the data content between a first content delivery network (CDN) and at least one client device using a communication channel, The SDCDN determines that at least one performance indicator of the one or more performance indicators exceeds a threshold performance value. The SDCDN identifies a different CDN in operative communication with the at least one client device. The different CDN includes the data content. In response to determining that at least one performance indicator exceeds the threshold performance value, the SDCDN transmits a transfer command to the at least one
(Continued)

client device to cause the at least one client device to switch to the different CDN and receive the data content from the different CDN.

17 Claims, 13 Drawing Sheets

(51) Int. Cl.
  *H04N 21/24* (2011.01)
  *H04N 21/262* (2011.01)
  *H04N 21/2225* (2011.01)
  *H04L 12/00* (2006.01)
  *H04L 12/64* (2006.01)
  *H04L 12/26* (2006.01)
  *H04L 29/08* (2006.01)

(52) U.S. Cl.
  CPC ......... *H04L 43/08* (2013.01); *H04N 21/2225* (2013.01); *H04N 21/24* (2013.01); *H04N 21/2402* (2013.01); *H04N 21/2405* (2013.01); *H04N 21/262* (2013.01); *H04L 65/608* (2013.01); *H04L 67/02* (2013.01)

(58) Field of Classification Search
  USPC .................................................. 709/203, 224
  See application file for complete search history.

(56) References Cited

U.S. PATENT DOCUMENTS

| | | | |
|---|---|---|---|
| 9,544,346 B1* | 1/2017 | Chakrovorthy | H04L 65/60 |
| 10,148,716 B1* | 12/2018 | Joseph | G06F 16/16 |
| 2013/0013730 A1* | 1/2013 | Li | H04L 65/80 709/217 |
| 2015/0012593 A1* | 1/2015 | Phillips | H04L 67/2847 709/204 |
| 2015/0296047 A1* | 10/2015 | Ghazisaidi | H04L 65/80 709/219 |

* cited by examiner

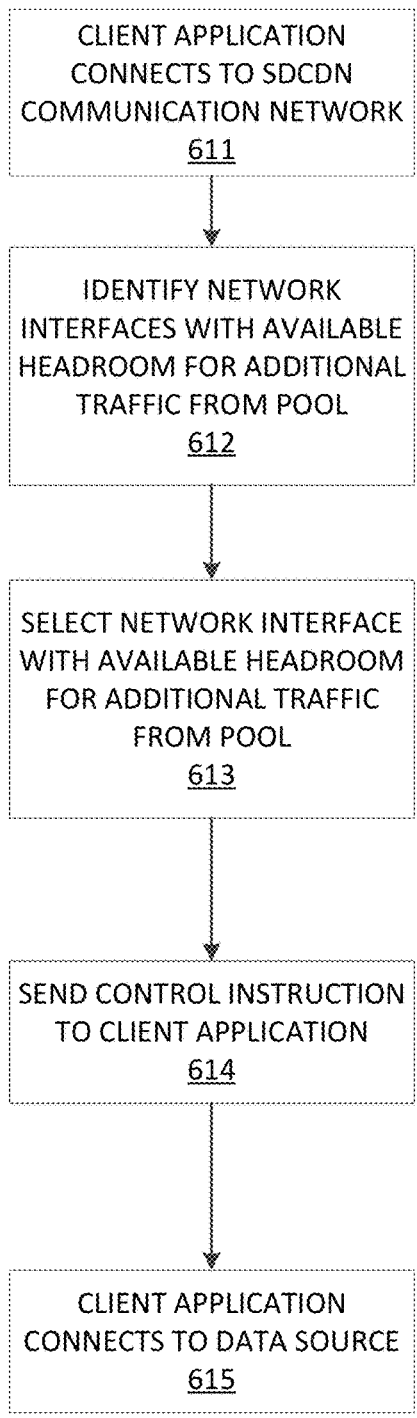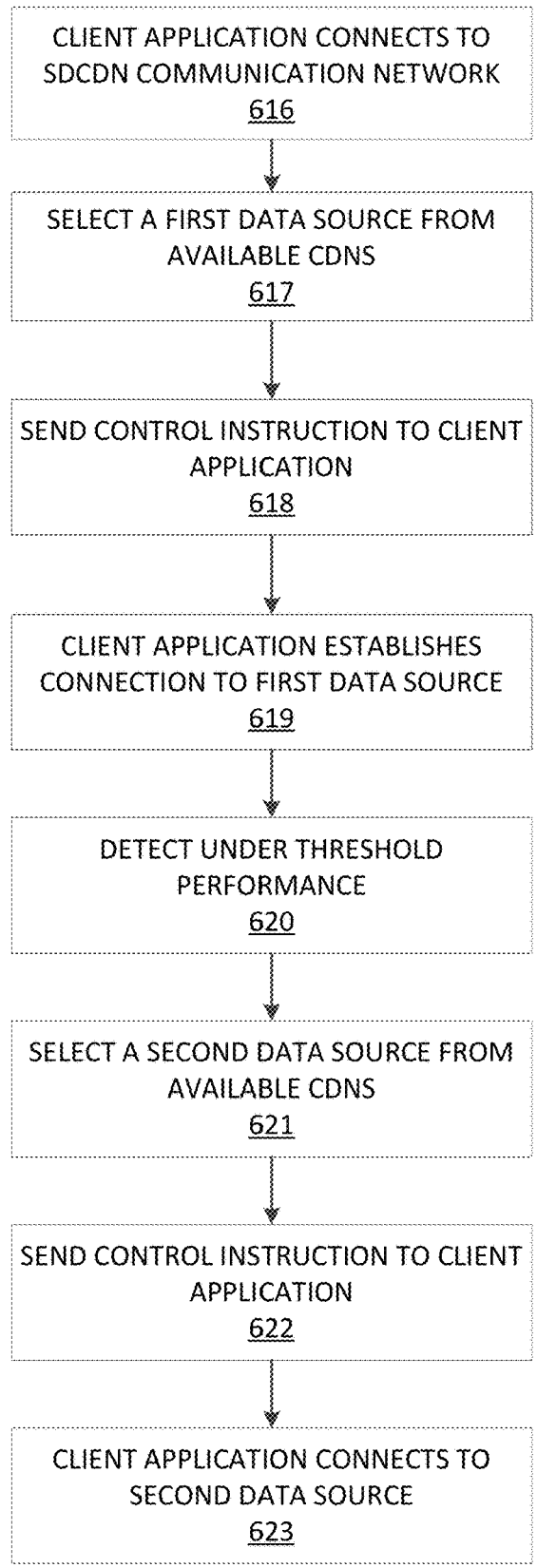
FIG. 6C
FIG. 6D

SOFTWARE DEFINED CONTENT DELIVERY NETWORK FOR FLEXIBLE, REAL-TIME MANAGEMENT OF LARGE-SCALE DATA TRANSFERS

CROSS REFERENCE TO RELATED APPLICATIONS

This application claims priority to U.S. Provisional Application No. 62/081,490, filed Nov. 18, 2014 and entitled "SOFTWARE DEFINED CONTENT DELIVERY NETWORK FOR FLEXIBLE, REAL-TIME MANAGEMENT OF LARGE-SCALE DATA TRANSFERS." which is incorporated by reference herein, in its entirety.

BACKGROUND

Field of the Disclosure

The present disclosure relates to content delivery networks (CDNs), and in particular optimizing data delivery between CDNs and corresponding client devices.

Description of the Related Art

The Internet of today is an ever-changing environment of a variety of distributed systems of servers deployed in multiple data centers around the world called content delivers networks (CDNs). However, using the geographically closest CDN or the most available CDN for the transfer of live or recorded content or data may not provide the best experience for the broadcasters or the consumers of the content or data. Additionally, distributing content at a large and/or geographically wide delivery scale can exacerbate the problem. Using the most available network or using a network with the lowest cost, based on a particular content transfer, or particular series of content transfers, may not be the most economic for the content or data transfer platform provider (herein described as platform provider).

A platform provider's goals relating to content or data (herein described as data content) transfers over networks (e.g. goals related to quality of content transfer and volume of content) are affected by a large variety of factors. For example, server network congestion, jitter (irregular pacing in the transfer of packets of data over networks) on either or both the long-distance and data-center portion of a content or data transfer chain (e.g., a long-haul) and on the local and private network portion of a content or data transfer chain (e.g., a last-mile), random packet loss (loss of packets of data during transfer over networks in random groups of one or two), especially on wireless networks, server network service issues; regional outages; and content and/or data transfer chain or border gateway protocol (BGP) flapping (rapid changes in network availability information). Generally, the platform provider can mitigate these factors by transferring data via a combination of CDN service providers (or CDN providers).

It is difficult and expensive for the platform provider to deploy its own networks globally at a sufficient scale. As such a platform provider typically relies on or supplements its network with, one or more such third-party CDN service providers. However, it is not ideal for a platform provider to use third-party provided CDN services. For example CDN providers usually achieve server selection by domain name service (DNS) resolution queries. Additionally, DNS resolution information may be cached. So even if network conditions change, another DNS resolution query may result in the cached information (e.g. host-name, IP) being used again. Thereby, leading the platform provider to the continued use of the same potentially suboptimal delivery method.

Furthermore, there is no effective communication regarding quality metrics between the clients and the delivery network. Communication is limited to a DNS resolution request by the client to connect to a specified server and re-initiating the same resolution request should data flow cease. In general, the delivery networks are not capable of sending control instructions to the clients to make quality-related adjustments. In fact the generic solutions offered by CDN providers do not take into account specific needs for video streaming. For example, the CDN providers' systems may not be equipped to collect or handle video-specific quality metrics, required for determining the optimal way of delivering video content.

It is also not ideal for a platform provider to rely on a single CDN provider. For example, in different geographical regions, different CDN providers have the different delivery capabilities. Furthermore data content transfers require the use of different CDNs in different geographical regions (e.g. contractual or other legal obligations). In another example, if the single selected CDN experiences an outage and there are no redundancies of at least one alternative CDN, a platform provider's services would cease so long as the CDN is experiencing downtime. In another example, data transfers that are particularly bandwidth-dependent can likely exceed the capabilities of any single commercial CDN. For instance, a large-scale video-streaming event with millions of consumers worldwide could be too much traffic for a single provider to handle. However, traffic congestion can still occur, even if a CDN provider has more overall capacity than the required bandwidth of one event content. This can occur because too many clients from the same region are attempting to consume the same content.

Problems also arise when platform providers use multiple CDN providers. For example, the difficulty of managing fee structures due to the variety of fee structures of multiple CDN providers. In another example, switching between CDN providers may not be seamless. For instance, when switching between CDN service providers, whether to achieve content or data-related goals or better efficiencies, a platform provider and consumers of such content can encounter time lags, quality changes, and temporary or permanent terminations in the content and/or data transfers.

Implementation of a distributed system of CDN providers does not solve the most troubling factors affecting a platform provider's goals. This is because there are many independent CDN providers involved at different levels in the data transfer chain. Furthermore a platform provider lacks configuration access to the various CDN providers' network and servers in the chain to make adjustments toward achieving their content/data related goals or efficiency goals. The lack of configuration access is especially problematic in the context of live video streaming, where real time configuration is merited. For example, the popularity of a live video globally or within a particular region would determine a need for a global CDN or if a regional provider would suffice. Furthermore, the popularity of the live video would also determine whether a particular regional CDN provider would be sufficient or if a regional CDN redundancy would also be required.

Content/data consumers and/or application providers other than the platform providers may also experience additional latency resulting from security layers in the data content transfer chain (e.g. virtual private network (VPN) connections or other tunneling methods). For example, an application user who works at an enterprise site during the day relocates to a remote location after work (e.g. home or a hotel). The application user continues to work with the same bandwidth/request-heavy or latency-sensitive application, but because of being on a foreign network, a VPN or other tunneling connection is required to access resources. The VPN may be filtered by the foreign network (e.g. hotel) and cause the required application to not work. Alternatively the VPN causes too much traffic to transfer between the user and the application provider's network traversing a large distance (increased latency). This could lead to time lags, quality changes, and temporary or permanent terminations in the content and/or data transfers. Regardless, the user would experience an unsatisfactory experience.

SUMMARY

The present disclosure provides techniques for real-time and flexible management by a content and/or data transfer platform provider (herein described as platform provider) of large-scale transfers of live or recorded content and/or any other type of data object (herein described as data content) to and from a variety of server networks, and to and from a large number of varied, and widely geographically distributed clients. The document will use mostly video in the examples to describe procedures, however, video content or data content can stand for any other file object to be delivered. Additionally the present disclosure provides techniques for the platform provider to achieve its goals (e.g. goals related to volume, quality and/or consistency of the content and/or data transferred, to cost and/or management efficiencies in using and/or selecting the server networks, and/or for balancing such goals against each other). This disclosure also provides devices and systems employing such techniques.

A content distribution system is also disclosed herein. The content distribution system includes a software layer (software defined content delivery network (SDCDN)), content distribution network(s) (CDN(s)), and client device(s). The CDN(s) are configured to provide access to video or any other content or data object (e.g., over the Internet, etc.) to a client device (e.g., on a resident video player, client application, web browser, etc.). In some embodiments, the client device is configured to access the data content by establishing a connection with a CDN.

In some embodiments, the software layer is above the CDN(s). The software layer operatively communicates to a changeable variety of server networks that connect to a changeable variety of client devices. The software layer collects and analyzes telemetry data about the data content transfer chain to achieve the platform provider's goals. Additionally, the software layer includes a control interface. The control interface enables dynamic adjustments to the variety of server networks used during data content transfers to achieve changeably-programmed data content related goals, and/or changeably-programmed goals related to server networks. Furthermore the control interface enables dynamic adjustments between server networks for particular or various data content transfers.

In some embodiments, a SDCDN establishes a communication channel (e.g., a control plane channel) with one or more client devices into a communication network. The SDCDN includes one or more nodes or devices and monitors performance indicators regarding an exchange of the data content (e.g., multimedia content or data file object) between a CDN and at least one client device using the communication network. In some embodiments, the SDCDN monitors multiple client devices using the communication network. For example, the SDCDN uses various protocols such as Real Time Messaging Protocol (RTMP), a Real Time Streaming Protocol (RTSP), a Hypertext Transfer Protocol (HTTP), Domain Name System (DNS) and a WebSocket Protocol, when monitoring the performance indicators between the CDN and at least one client device using the communication channel. Additionally, with respect to the communication channel, the communication channel is defined through at least one CDN, at least one point of presence (PoP) server, and at least one client device (e.g. application requesting data content) via a foreign network (e.g. an Internet service provider (ISP) network).

In some embodiments, the SDCDN determines whether at least one performance indicator (e.g., cost, latency, bandwidth, efficiency, jitter, location, and the like) exceeds a threshold performance value, between one CDN and a client device. The performance indicator is associated with an exchange of data content between the CDN and the client device. If a performance indicator exceeds a threshold performance value, the SDCDN identifies a different CDN to transfer data content to the client device. The different CDN is also in operative communication with the client device and includes the same data content as the previous CDN. As such, the SDCDN transmits a transfer command to the client device to cause the client device to switch to the different CDN and receive the data content from the different CDN.

In some embodiments, the SDCDN determines a value to associate with the performance indicator, and based on the value, determines or assigns a second CDN as the different CDN.

In some embodiments, the SDCDN determines that an issue exists proximate to the client device that cannot be solved by instructing the client device to switch to another CDNs—meaning the issue is outside the control of the SDCDN. As such, the SDCDN instructs the client device to switch back to the initial CDN to receive data content from the initial CDN.

These and other features of the systems and methods of the subject disclosure will become more readily apparent to those skilled in the art from the following detailed description of the embodiments taken in conjunction with the drawings.

BRIEF DESCRIPTION OF THE DRAWINGS

Those skilled in the art to which the subject disclosure appertains will readily understand how to make and use the devices and methods of the subject disclosure without undue experimentation, example embodiments thereof will be described in detail herein below with reference to certain figures, wherein:

FIG. 6C illustrates an example method by which the present technology can be utilized to serve data based on pre-programmed pool of network interfaces with headroom for additional traffic;

FIG. 6D illustrates an example method by which the present technology can be utilized to switch data sources a client device is retrieving data content from, based on pre-programed quality thresholds;

DESCRIPTION OF EXAMPLE EMBODIMENTS

As discussed above, client devices, using conventional content delivery network (CDN) techniques can result in sub-optimal performance, both from the perspective of the content provider, data transfer platform provider, and the subject client device.

Figure 1:
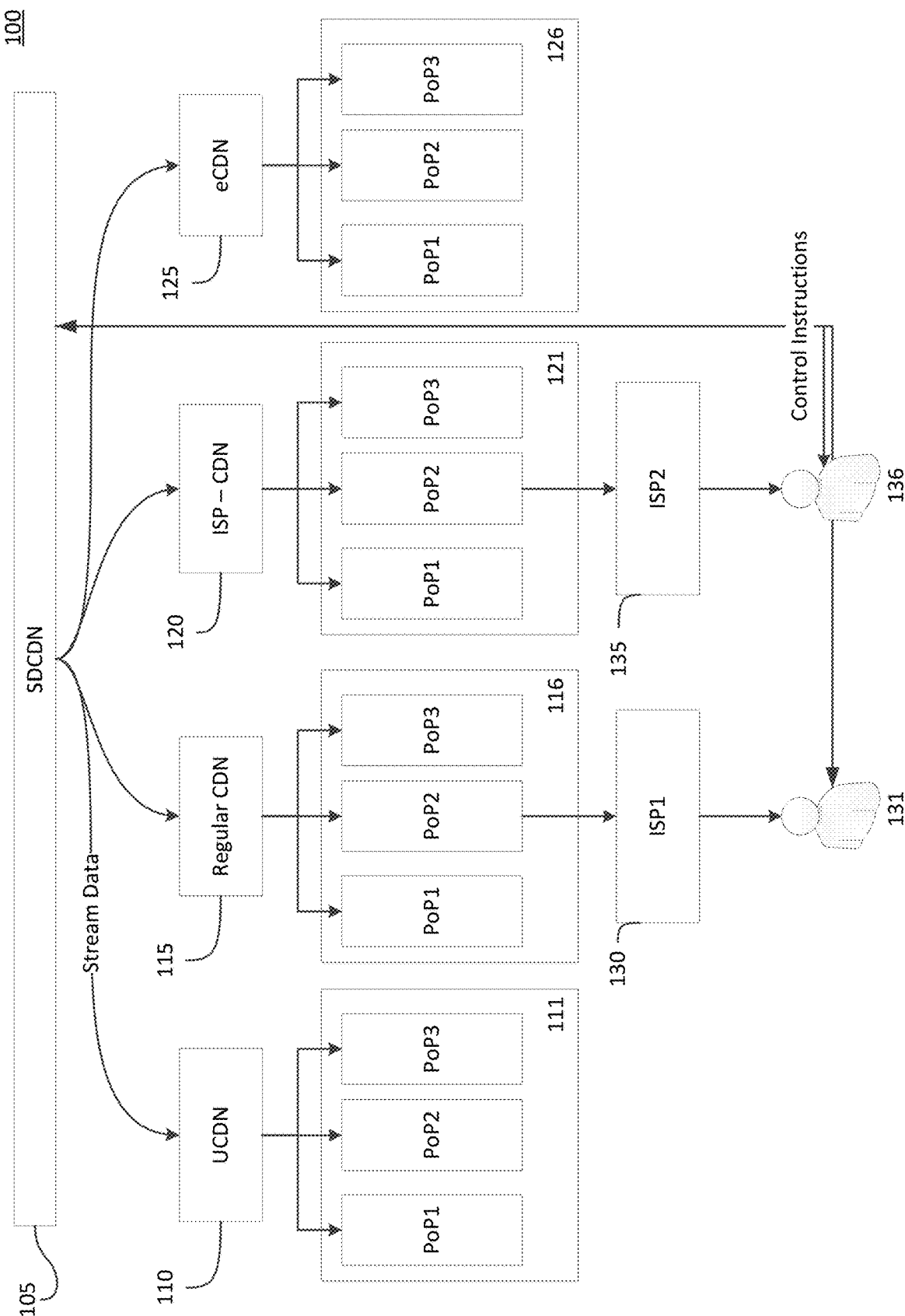
FIG. 1 illustrates an example communication network.

The subject disclosure addresses these above-described problems by the implementation of a software layer. FIG. 1 illustrates an example communication network 100, including a device-implemented software layer, software defined content Delivery Network (SDCDN) 105. Communication network 100 illustratively shows a geographically distributed collection of sub networks, including various content delivers networks (e.g., UCDN (Ustream CDN—a CDN, operated by Applicant) 110, Regular CDN 115, ISP-CDN 120, and eCDN (Enterprise CDN) 125), corresponding point of presence (PoP) servers (e.g., POPs 111, POPs 116, POPs 121, and POPs 126), two Internet service provider (ISP) networks (e.g., ISP 130 and ISP 135), and two client devices (e.g., client device 131 and client device 136). In some embodiments, as illustrated in communication network 100, the implementation of the software layer is above the CDNs. For example, in communication network 100, SDCDN 105 is above CDNs as an orchestration layer (e.g., UCDN 110, Regular CDN 115, ISP-CDN 120, and eCDN 125).

The software layer defines a software defined content delivery (SDCD) process or techniques and resides in a SDCDN layer (e.g. SDCDN 105). The SDCDN layer, using the SDCD techniques, is a logical orchestration layer. As described herein, the SDCD techniques operate programmed and re-programmable decision-making processes that optimize an exchange of data content between multiple CDNs (e.g., UCDN 110, Regular CDN 115, ISP-CDN 120, and eCDN 125) and corresponding client devices (e.g., client device 131 and client device 136). As such, the SDCD techniques enable a particular client device to use different CDN service providers based on the best delivery capabilities in different geographical regions. Further, the SDCD techniques provide redundancy when, for example, a particular CDN is unavailable to the client device (e.g., power failure, network failure etc.). With respect to the optional control interface, CDN optimization settings can be re-programmed in real time as well.

The SDCD techniques provide real-time decision-making processes and are operable to receive telemetry data (e.g. connection status, geographic location, information about the utilization of content and/or data transfer, and network traffic congestion) from each client. Based on such telemetry data, the SDCD techniques implement programmed and re-programmable logic to make decisions to maximize the quality of the content and/or data transfers for as many consumers as possible and/or to maximize the volume of the content and/or data transfers. Additionally, the measurement of the quality of data content includes resolution, continuity and/or sustainability. Furthermore, the reach of a particular data content transfer and/or maximizing the overall number of data content transfers can be a measure of the volume of data content transfers. Notably, with the addition of the optional control interface, the quality-related logic can be re-programmed in real time.

Additionally, the SDCD techniques are able to identify in real-time the popularity of data content and based on the popularity of the data content whether a CDN would suffice. For example, the SDCD identifies whether live data content is globally popular or popular within a particular region. As such depending on the popularity of the CDN, the SDCD techniques determine (1) a need for a global CDN or if a regional provider would suffice, and (2) whether a particular regional provider with sufficient local scale would suffice or regional redundancy would also be required.

The SDCD techniques can additionally identify in real time when broadcasters ingests data content. In some embodiments SDCD techniques identify preferred dedicated data content transfer chains for such ingestions. This is to help ensure proper upload of data content into the platform of the platform provider. Additionally, with inclusion of the optional control interface, the data content-popularity logic and the settings relating to ingesting data content can be re-programmed in real time.

The SDCD techniques are able to take into account programmed factors relating to the contractual terms between multiple CDN service providers and the platform provider. Example factors are: minimum periodic usage commitments, usage caps, and possible usage overage charges, to maximize cost efficiencies for the content and/or data transfer platform provider. The logic associated with the SDCD techniques is responsible for utilizing every CDN provider beyond minimum periodic usage commitments, while preventing overcharges by exceeding the caps. In some embodiments, the logic results in achieving 100% utilization of CDN contractual commitments.

Additionally, the logic associated with the SDCD techniques are reprogrammable. For instance, the reprogrammed logic includes updated factors upon termination of contracts with CDN service providers, upon implementation of new CDN service providers, and/or upon entry into new terms with existing CDN service providers. Furthermore, with inclusion of the control interface, reprogramming the logic may be done in real-time.

The SDCD techniques can also take into account programmed factors relating to the contractual terms between platform provider and IP transit/transport provider or peering partner. The programmed factors can take into account the utilization levels of communication channels (physical network interconnection ports) between parties. As such, the SDCD techniques can set a maximum level of outgoing utilization (sending data content) on such communication channels and/or set the traffic levels to programmed limits. With this technique the cost efficiency of the particular communication channel utilizing the industry standard 95% billing method (used by flow-based accounting) can be dramatically improved, and levels can be set to a programmed level and kept there constantly.

Control instructions propagate decisions made according to the SDCD techniques, to each client (or to several clients en masse). The instructed client(s) is(are) able to seamlessly switch between CDNs, their point of presence (PoP) devices/servers in different geographies, and even Internet service providers (ISPs), because the SDCDN orchestration layer above all the CDNs. This is to avoid typical time lags, quality changes, and temporary or permanent terminations in the content and/or data transfers.

The SDCD techniques are also able to maintain bidirectional connections with clients. For example, client device 131 and client device 136 send telemetry data to the software layer and SDCDN 105 sends instructions to the client device 131 and client device 136. CDN selection and data content transfer chain selection is transparent to both the broadcaster (content provider) and the consumer. The SDCD techniques employ automatic processes for making and implementing programmed decisions in real time to simplify for the platform provider the management of multiple CDN options. Additionally, inclusion of the control interface further simplifies such management in enabling real-time reprogramming of the SDCDN's processes.

The client devices, PoP servers, CDNs, and SDCDN are interconnected by communication links and segments for transporting data between content providers (not shown) and each of the networks/devices shown. Many types of networks are available (e.g., ranging from local area networks (LANs) to wide area networks (WANs)), and many types of interconnecting links are available as well (e.g., wired, wireless, etc.). The various devices and networks are also interconnected by various methods of communication. Those skilled in the art will understand that any number of devices, networks, links, etc. may be used in the communication network, and that the view shown herein is for simplicity. Further, each of the networks can include any number of sub-devices or nodes (e.g., switches, routers, etc.), as appropriate.

The software layer, SDCDN 105, communicates with each of the client devices 131 and 136 using a communication channel 140. For example, as discussed in U.S. Ser. No. 13/592,171 filed Aug. 22, 2012, the entirety of which is incorporated by reference herein, the communication channel 140 can include a bi-directional connection between SDCDN 105 and a client device. In some embodiments, the bidirectional channel is separate from a content data stream (e.g., a multimedia data stream, data file object download, etc.), and allows an exchange of operational or performance data and control messages between each client device (e.g. client device 131 and client device 136) and SDCDN 105.

Figure 2:
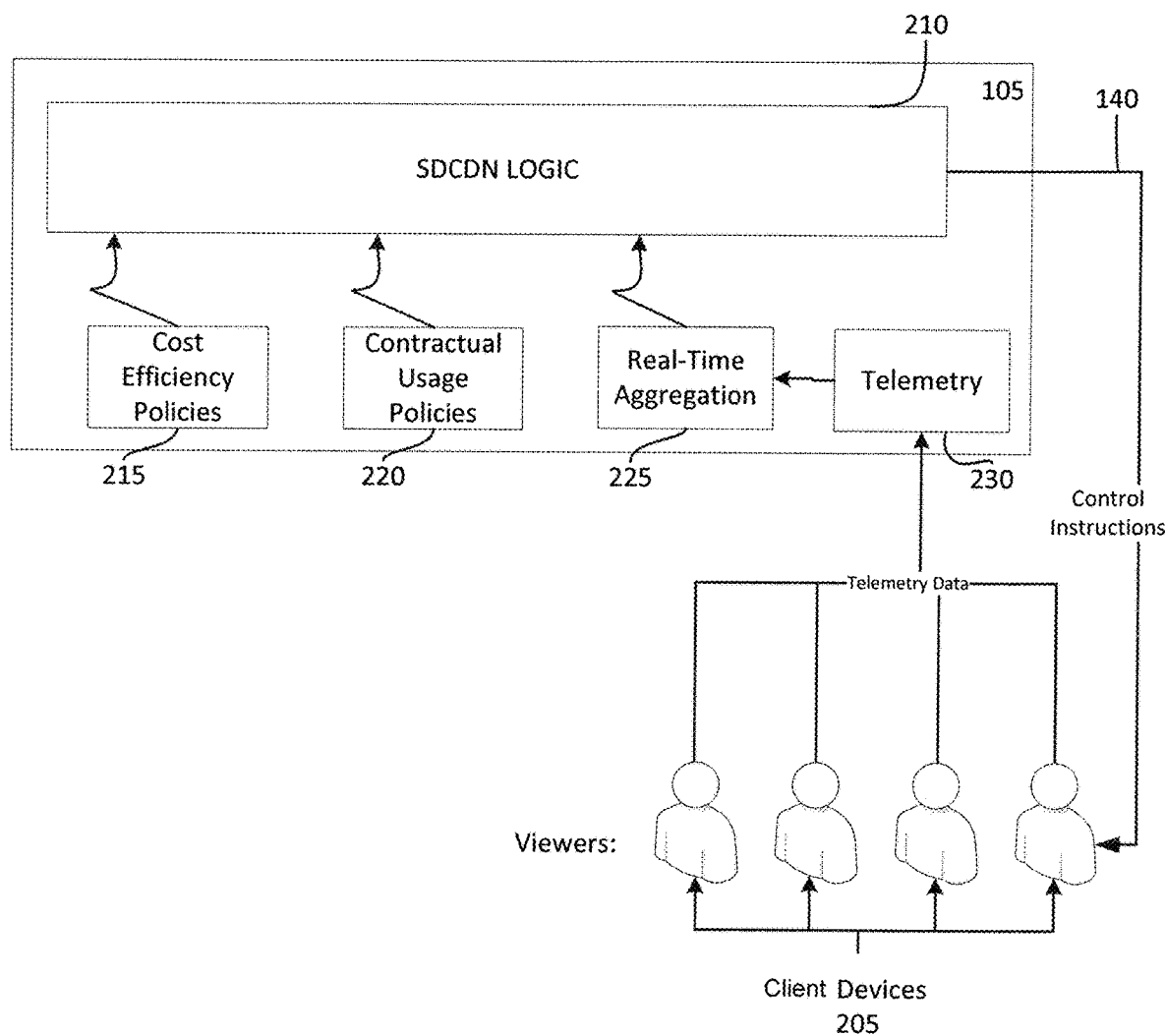
FIG. 2 illustrates an example software defined content delivery network (SDCDN) device.

FIG. 2 illustrates a schematic block diagram of SDCDN 105, showing various sub-modules. As described above, SDCDN 105 is a logical layer that operatively communicates with various client devices using communication channel 140. For example, the SDCDN 105 issues control instructions using control channel 140 and monitors an exchange of data content delivery from various CDNs to respective client devices 205. For instance, telemetry data 230 of client devices 205 from real-time aggregation module 225.

Additionally, SDCDN 105 includes a SDCDN logic module 210, which employs the SDCD techniques or processes described above. In employing such SDCD techniques the SDCDN logic module 210 also analyzes data from sub-modules, including a cost efficiency policy module 215, a contractual usage policy module 220, and the real-time aggregation module 225 (e.g., including buffering ratio, geolocation, AS information, bandwidth use, etc.).

Figure 3:
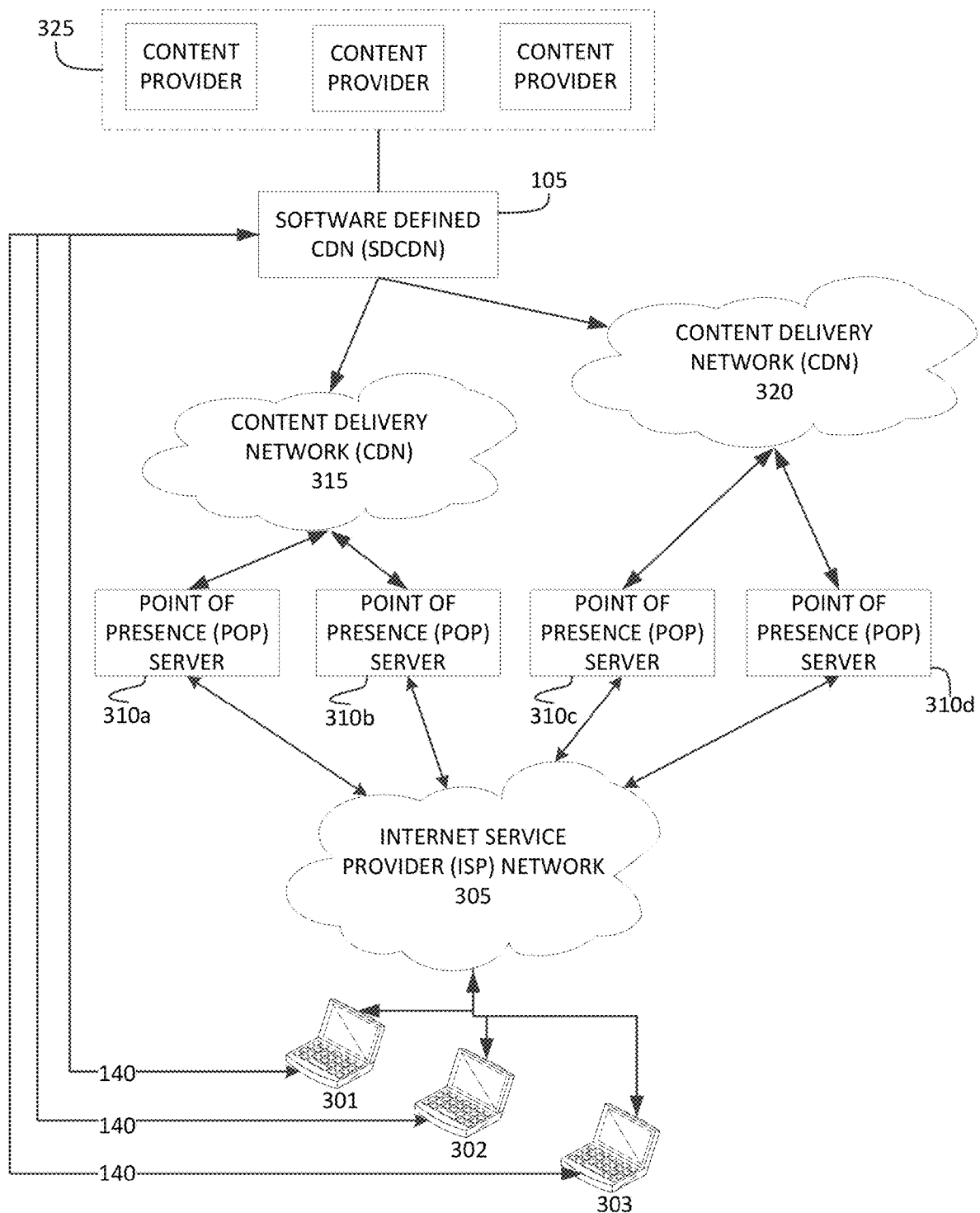
FIG. 3 illustrates another example view of the communication network.

FIG. 3 illustrates another configuration of network 100, labeled as network 300. Network 300, similar to network 100, shows various client devices 301, 302, 303, an Internet Service Provider (ISP) Network 305, corresponding Point of Presence (PoP) servers 310a-310d, CDN 315, CDN 320, SDCDN 105, and various content providers 325.

Operatively, content providers 325 (e.g., media companies, e-commerce vendors, etc.) pay CDN operators (e.g., operators of CDN 315 and 320) to deliver their respective data content (e.g., multimedia content or data file objects) to a requesting end-user (e.g., client devices 301, 302, and 303). The CDN provider, in turn, pays ISPs (e.g., corresponding to ISP 305), carriers, and network operators for hosting its servers in their data centers or pays the ISPs to gain connectivity and by that access to the ISP network. As discussed above, CDNs improve performance, availability for data content (e.g., multimedia content or data file objects), and also offload the traffic served directly from the content provider's origin infrastructure, resulting in better quality of experience for consumers.

Client devices 301, 302 and 303 request content to nodes (e.g. CDNs) that are "optimal." Metrics describing optimization, for example, include proximity of node location and latency between the request client device and a CDN. The closer the proximity and/or the lower the latency between the requesting client device and the CDN, the more "optimal" the node. In some embodiments, these metrics are independent from one CDN to another and from one client device to another. As such, the logic of the SDCDN determines which metric to use, in determining which optimal CDN the client device should switch to. For example, in some situations, a client device or destination node may be physically closest to a CDN or source node, but with high latency (e.g., in network seconds). In such situations, the CDN or source node may not be the most optimal node for the client device to connect with. In sonic embodiments, the SDCDN balances these metrics to provide optimal performance. Additional optimal characteristics can also include a highest availability of the CDN in terms of server performance (both current and historical), so as to optimize delivery across local networks. Furthermore, measurements of optimization further include costs, whereby locations that are least expensive to server content can be a factor in choosing the network.

POPs 310a-310d are "edges" or "edge networks" since they are the closest edge of CDN assets to the end user here, client devices 301-303. CDNs 315 and 320 provide services to corresponding POPs depending on, for example, geographic coverage.

Operatively, a requesting client device, for example client device 301, requests data content (e.g., multimedia content or data file object) from a CDN, for example CDN 315. As is appreciated by those skilled in the art, a data content request is routed through ISP (or corporate) network 305, appropriate PoPs, and onward to a corresponding CDN. Various other network devices or nodes facilitate this process e.g., routers, switches, Domain Name Service (DNS) nodes, and the like). CDN 315 receives the request and, in response, provides the data content to the client device (again, through an appropriate PoP, ISP, etc.). SDCDN 105 monitors performance indicators including, but not limited to, telemetry data, client and/or CDN status, geographic location, data content delivery information, network traffic congestion, cost, bandwidth, efficiency, load-balancing, usage, latency, jitter, and the like, using communication channel 140. When the performance indicator exceeds a particular threshold performance value, SDCDN 105 transmits a transfer command to the client device to cause the client device to switch to a different CDN and receive the requested content from the different CDN.

Figure 4:
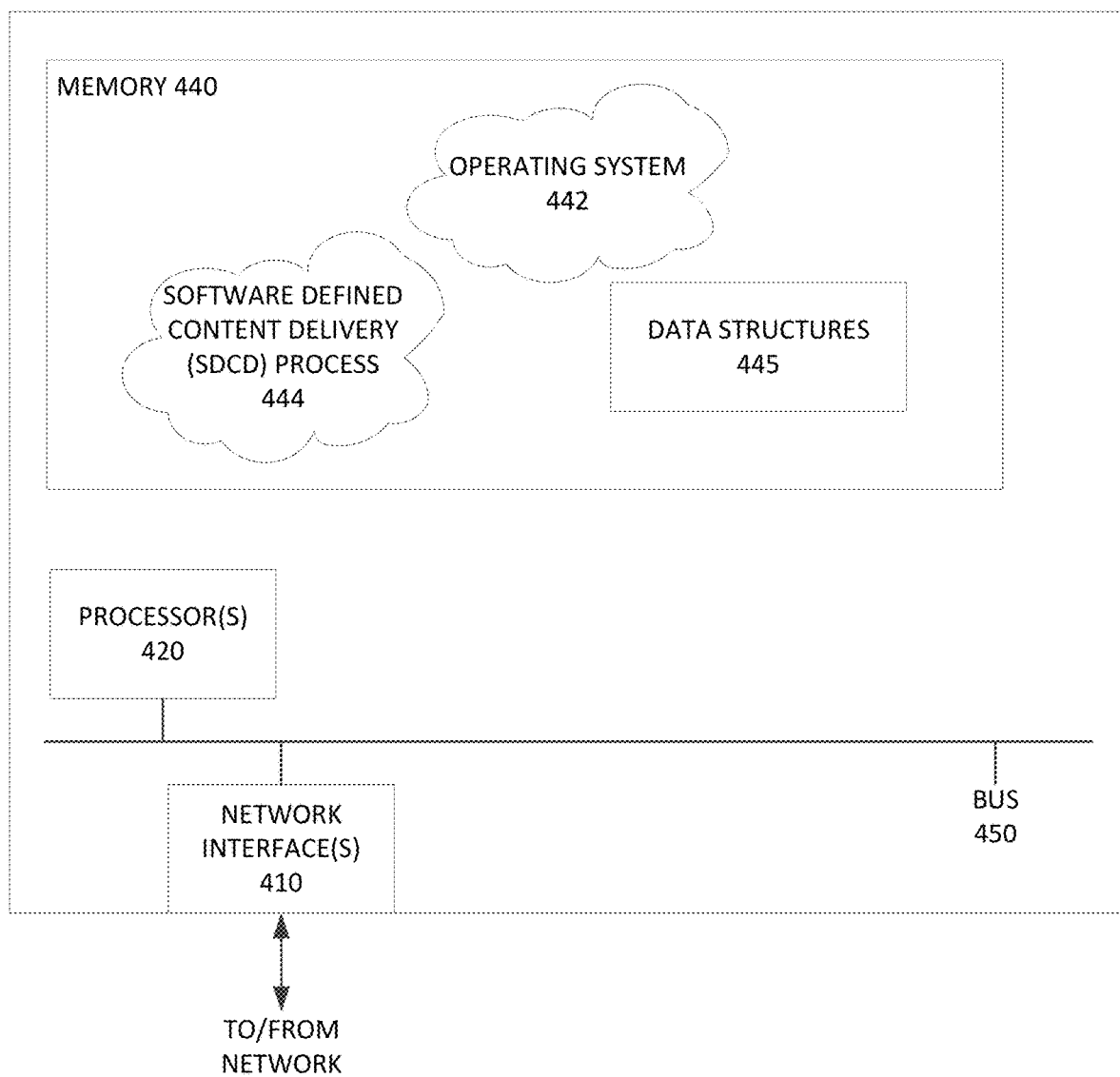
FIG. 4 illustrates an example node/device in the communication network shown in FIG. 3.

FIG. 4 illustrates an example node/device 400 that may be used with one or more embodiments described herein, (e.g., a device employing SDCD techniques/processes) in the SDCDN 105. The device 400 may comprise one or more network interfaces 410, at least one processor 420 (e.g., a hardware controller/processor), and a memory 440 interconnected by a system bus 450.

The network interface(s) 410 contain the mechanical, electrical, and signaling circuitry for communicating data over physical and/or wireless links coupled to the SDCDN 105. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, Real Time Messaging Protocols (RTMP), a Real Time Streaming Protocols (RTSP), a Hypertext Transfer Protocols (HTTP), Domain Name System (DNS) and WebSocket Protocols, etc.

The memory 440 comprises a plurality of storage locations that are addressable by the processor 420 and the network interfaces 410 for storing software programs and data structures associated with the embodiments described herein. In some embodiments device 400 may include limited memory or no memory (e.g., no memory for storage other than for programs/processes operating on the device 400). The processor 420 may comprise necessary elements or logic adapted to execute the software programs and manipulate data structures 445.

An operating system 442, portions of which are typically resident in memory 440 and executed by the processor, functionally organizes the device by, inter alia, invoking operations in support of software processes and/or services executing on the device. For example, these software processes and/or services may comprise SDCD process/services 444. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

SDCD process/services 444 contains computer executable instructions executed by the processor 420 to perform functions provided by one or more routing protocols, such as proactive or reactive routing protocols as will be understood by those skilled in the art.

Illustratively, the techniques described herein may be performed by hardware, software, and/or firmware, such as in accordance with the SDCD process 444, which may contain computer executable instructions executed by the processor 420 (or independent processor of interfaces 410) to perform functions relating to the techniques described herein.

SDCD process 444, when employed by device 400, operatively monitors performance indicators regarding an exchange of the data content between a CDN and corresponding client device. In some embodiments, SDCD process 444, transmits a transfer command to the client device or device 400 to switch to a different CDN when the performance indicator(s) exceeds a particular threshold performance value. When device 400 switches to a different CDN, device 400 receives the requested data content from the different CDN.

Figure 5A:
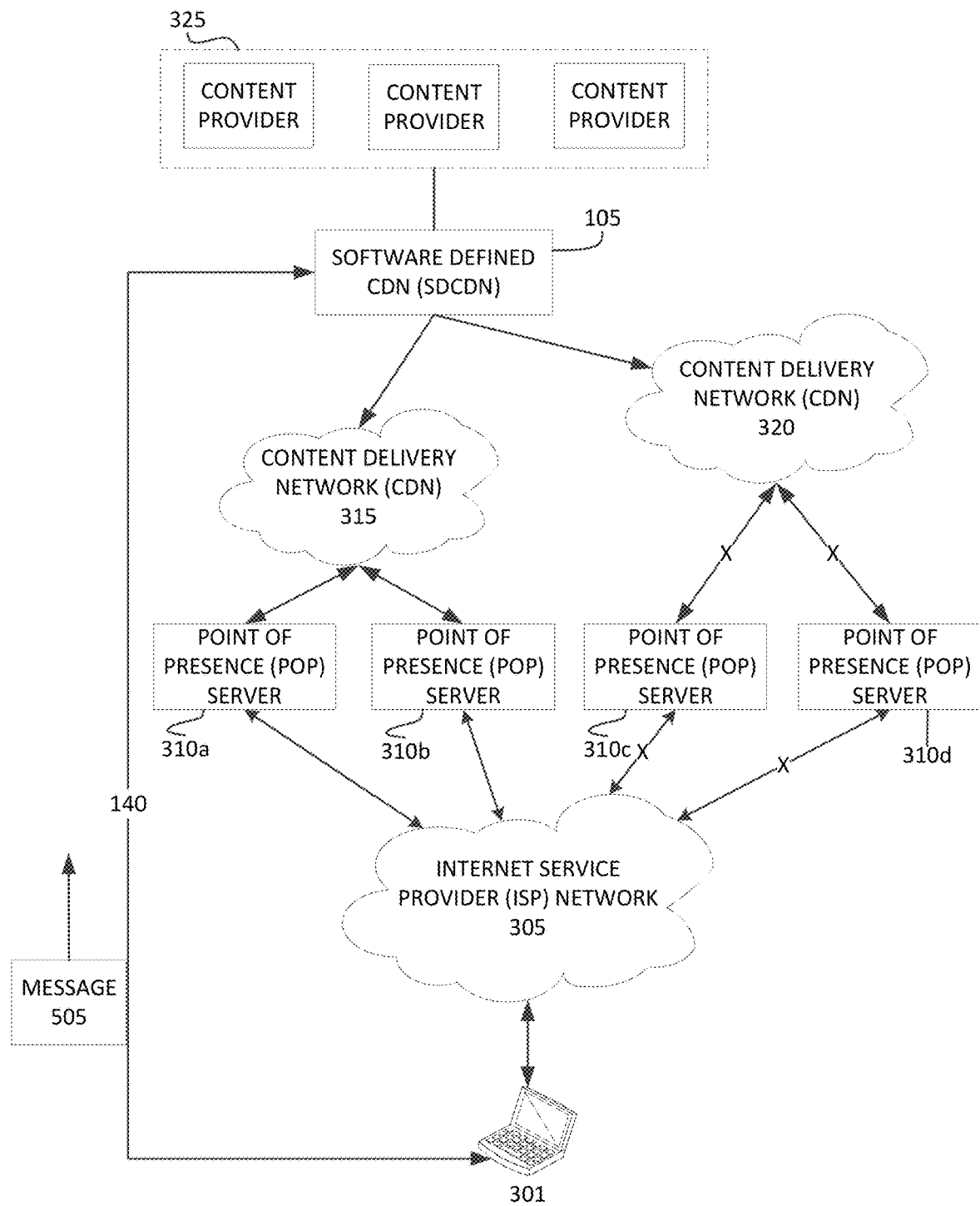
FIGS. 5A, 5B, and 5C collectively illustrate an example Software Defined Content Delivery (SDCD) process.
Figure 5B:
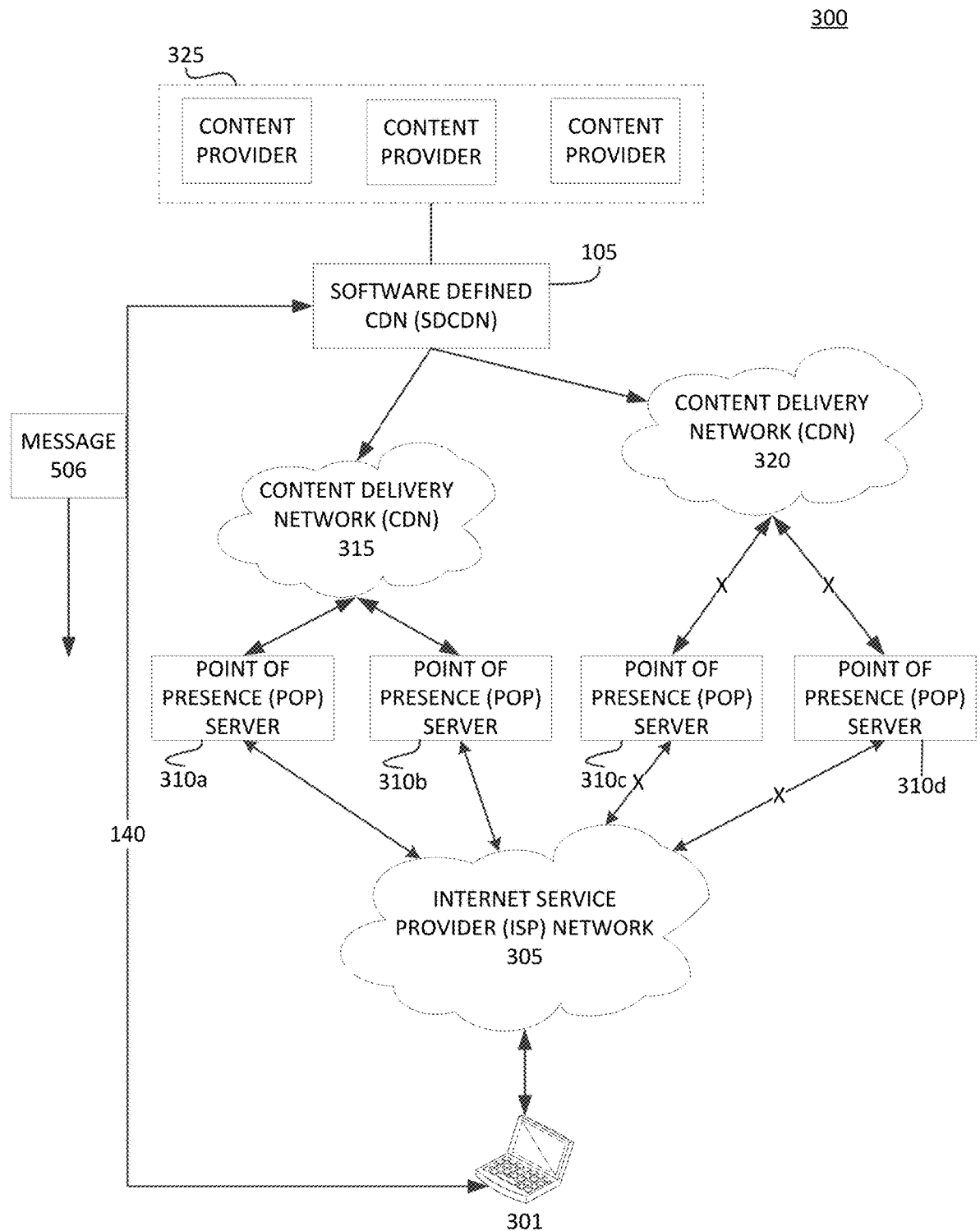
Figure 5C:
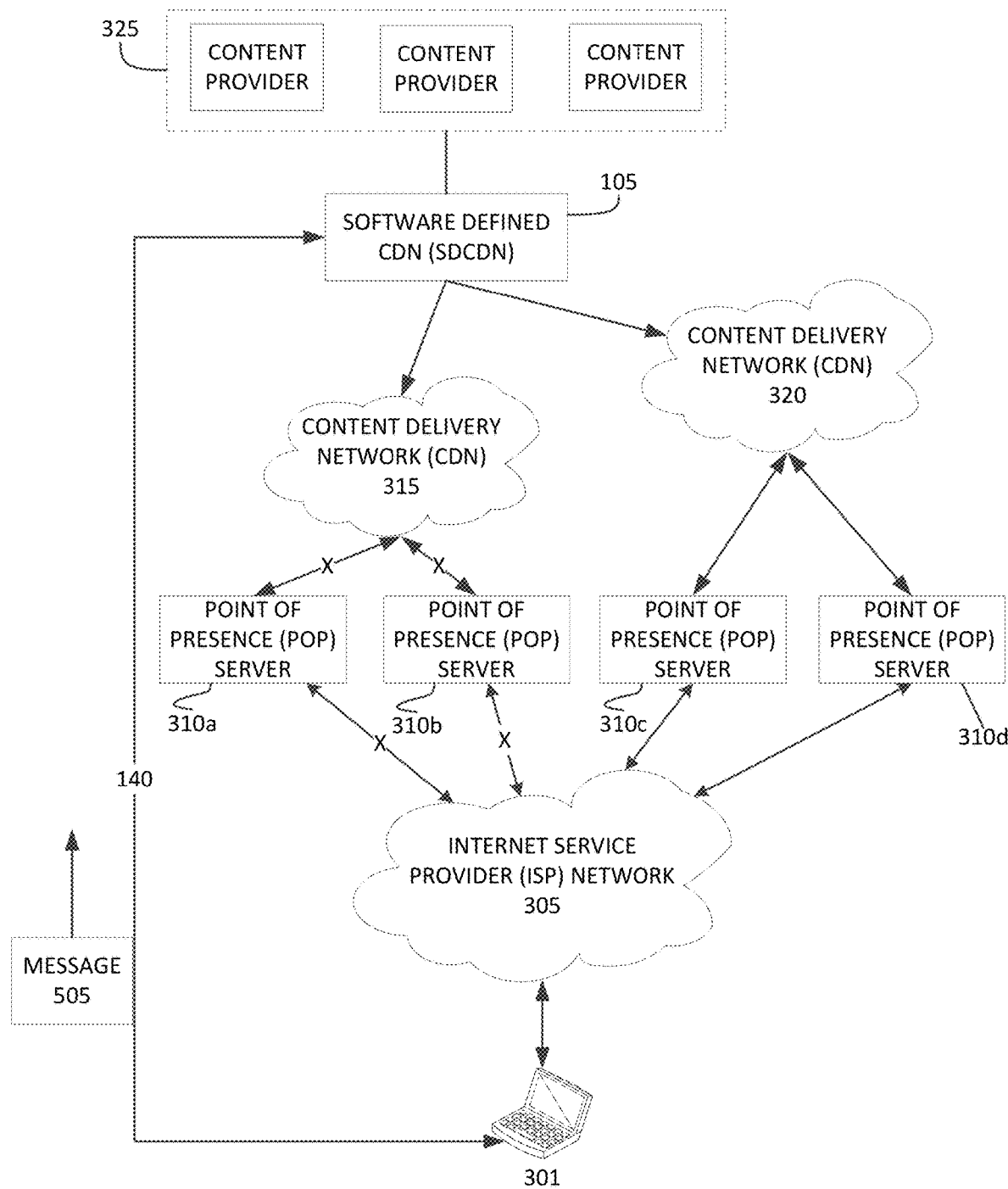

For example, FIGS. 5A-5C collectively illustrate an example SDCD process 444 (e.g., employed by SDCDN 105) when the performance indicator(s) exceeds a particular threshold performance value. FIG. 5A illustrates client device 301, within network 300, receiving data content (e.g., multimedia content, data file object, etc.) from CDN 315. As discussed above, SDCDN 105 monitors this exchange using communication channel 140—e.g., via message(s) 505. For example, client device 301 sends messages such as telematics messages to SDCDN 105. Communication channel 140 is shown as separate from the various networks (e.g., IPS network 305, CDN 315, etc.), and communication channel 140 is typically defined through such networks using various protocols appreciated by those skilled in the art (e.g., a Real Time Messaging Protocol (RTMP), a Real Time Streaming Protocol (RTSP), a Hypertext Transfer Protocol (HTTP), Domain Name System (DNS) and a WebSocket, and the like). The client device control is achieved on the communication channel 140 (control plane), while the data retrieval is achieved on data channels (between client device 301 and content provider 325).

SDCDN 105 monitors performance indicators either included in or based upon message(s) 505, and determines when the monitored performance indicator or indicators exceed(s) a threshold performance value. SDCDN 105 also identifies other CDNs in operative communication with client device 301 namely, CDN 320—which CDN also includes the requested data content for client device 301.

As shown in FIG. 5B, when the at least one performance indicator exceeds the threshold performance value, SDCDN 105 transmits a transfer command—e.g., a message 506—to the client device 301. Client device 301 receives the transfer command and in FIG. 5C, client device 301 switch to CDN 320 to continue receiving the requested data content (e.g., multimedia content or data file objects).

In some embodiments, SDCDN 105 determines a value for the performance indicator(s), and based on the value of the performance indicator, determines which CDN to instruct client device 301 to switch to.

In some embodiments, the SDCDN iteratively monitors the next or different CDN. For example, SDCDN monitors the next or different CDN after determining at least one performance indicator between the previous CDN, and a client device exceeds the threshold performance value and instructs the client device to switch to and receive data content (e.g., multimedia content or data file objects) from the next or different CDN. Additionally each CDN the SDCDN instructs the client device to switch to and receive data content from, is operatively in communication with the client device and includes data content similar to the previous CDN.

However, in some situations, an issue with data content (e.g., multimedia content or data file objects) transfer to the client device from the CDN exists proximate to the client device and cannot be solved by instructing the client device to switch to other CDNs. Meaning the issue is outside the control of the SDCDN (e.g., a weak local wireless signal from a wireless router causing live streaming content from a CDN to buffer or intermittent interruptions of data transfer of a data file object). In these situations and in some embodiments, the SDCDN transmits a transfer command to the client device responsive to the issue to cause the client device to switch back to the first or initial CDN (the CDN the client device was initially operatively communicating with and receiving data content from) and receive the data content from the initial CDN. In other embodiments, SDCDN is configured to determine an issue exists in the communication network proximate to the client device, when a threshold number of successive switches occur due to continued determination that the performance indictor exceeds the threshold performance value between the client device and all previous CDNs.

Reference is now made to FIGS. 6A-6J. FIGS. 6A-6J illustrate several example methods by which the SDCDN can be used to make decisions about a preferred CDN for serving data to a client device. It will be appreciated by those skilled in the art that these methods are not mutually exclusive, and that they can be used in combination with each other, as well as other techniques to select a preferred CDN to serve data to a client. As described below, data source refers to any URL with access to content data, including self-operated CDN edges or 3$^{rd}$ party CDN networks.

Figure 6A:
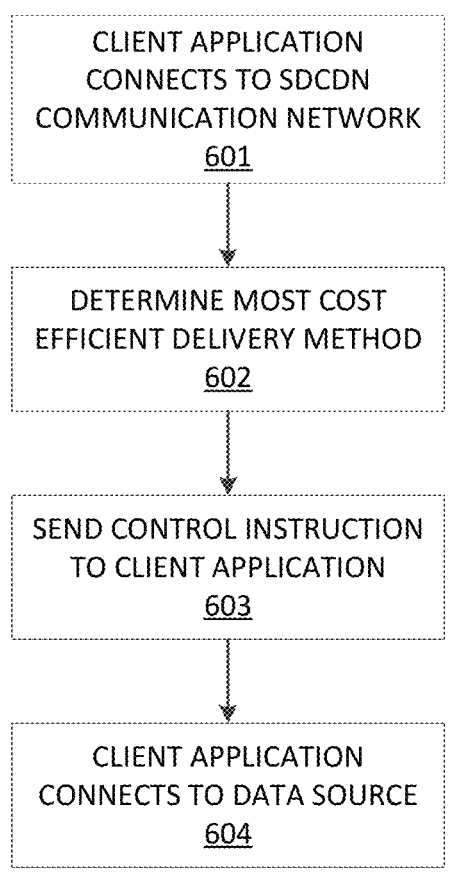
FIG. 6A illustrates an example method by which the present technology can be utilized to serve data in a cost optimized manner.

FIG. 6A illustrates an example method by which the present technology can be utilized to serve data in a cost optimized manner. The method could be carried out by any of the example system embodiments addressed above. For example, SDCDN layer 105 in FIG. 2 can include a cost efficiency policies database 215 of content delivery methods and data sources with associated costs. SDCDN logic 210 can utilize this data to determine the most cost efficient content delivery method available, and instruct a client application to utilize the most cost efficient content delivery method. For instance, as illustrated in FIG. 6A, at step 601, a client application connects to SDCDN communication network (e.g. control plane 140) and requests data content. At step 602, the SDCDN logic determines most cost efficient content delivery method available based on information in the cost efficiencies policies database 215. At step 603, the SDCDN logic sends a control instruction to the client application via the control plane to connect to the selected data source using a specified CDN. Based on the control instructions, at step 604, the client application establishes connection to the data source and retrieves the content from the data source.

Figure 6B:
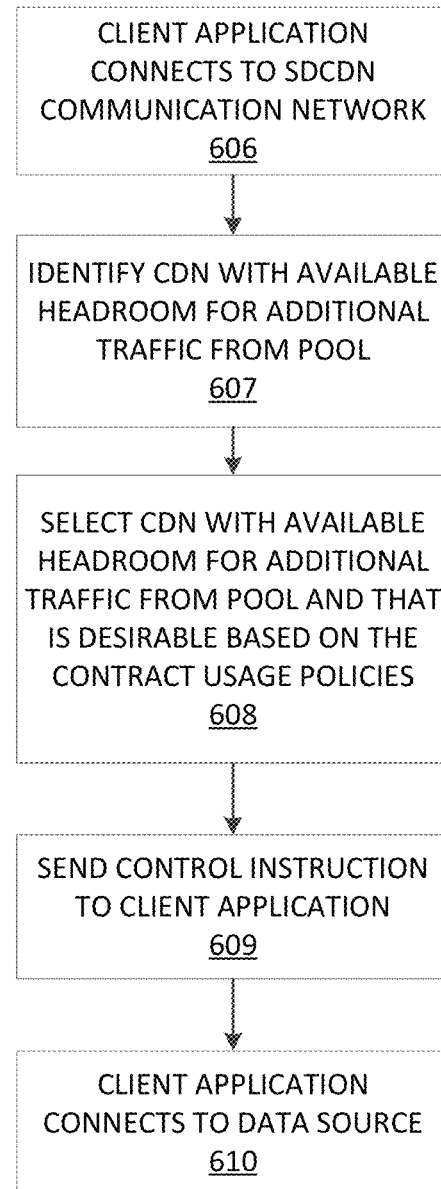
FIG. 6B illustrates an example method by which the present technology can be utilized to serve data based on previously established CDN commitments.

FIG. 6B illustrates an example method by which the present technology can be utilized to serve data to satisfy contractual usage commitments of certain CDNs. The method could be carried out by any of the example system embodiments addressed above. For example, SDCDN layer 105 in FIG. 2 can include a contractual usage policies database 220 of available CDNs with traffic volume targets and maximums. SDCDN logic 210 can utilize this data to look up a CDN with available headroom for additional traffic, and instruct a client application to retrieve data content from a CDN with available headroom for additional traffic. For instance, as illustrated in FIG. 6B, at step 606, a client application connects to SDCDN communication network (e.g. control plane 140) and requests data content. At step 607, the SDCDN logic looks up the pre-programmed traffic targets from the available CDN pool. At step 608, the SDCDN logic selects a CDN from the pre-programmed pool that has available headroom for additional traffic and that is desirable based on the contract usage polices database 220. At step 609, the SDCDN logic sends control instructions to the client application via the control plane to connect to the selected data source using the selected CDN. Based on the control instructions, at step 610, the client application establishes connection to the data source using the selected CDN and retrieves the content from the data source.

FIG. 6C illustrates an example method by which the present technology can be utilized to serve data to satisfy contractual usage commitments and peering arrangements. The method could be carried out by any of the example system embodiments addressed above. For example, SDCDN layer 105 in FIG. 2 can measure and collect network interface counters from devices used for content delivery. Further SDCDN layer can include contract usage policies database 210 to establish and pre-program a list of interfaces used for content delivery with traffic level targets. SDCDN logic 210 can utilize this data direct traffic according to contractual usage commitments and peering arrangements. For instance, as illustrated in FIG. 6C, at step 611, a client application connects to SDCDN communication network (e.g. control plane 140) and requests data content. At step 612, the SDCDN logic looks up the pre-programmed traffic targets from the available pool of network interfaces that is used to deliver data content. At step 613, the SDCDN logic selects a network interface from the pre-programmed pool that has available headroom for additional traffic. At step, 614, the SDCDN logic sends control instruction to the client application via, the control plane to connect to the selected data source using the selected network interface. Based on the control instructions, at step 615, the client application establishes connection to the data source (data plane) and retrieves the content from the data source using the selected network interface.

FIG. 6D illustrates an example method by which the present technology can be utilized to switch data sources a client device is retrieving data content from, based on pre-programed quality thresholds (e.g. availability of data content, speed (bit/second), latency (ms), etc.). The method could be carried out by any of the example system embodiments addressed above. For example, SDCDN layer 105 in FIG. 2 can be connected to multiple data sources (content delivery networks) both being able to serve the same data to a client, the SDCDN layer 105 can include logic including delivery quality thresholds (e.g. availability of data content, speed (bit/second), latency (ms), etc.). SDCDN logic 210 can utilize this data to determine when the performance between the client application and a data source meets a delivery quality threshold, and instruct a client device to switch to a different data source from which to retrieve data content. For instance, as illustrated in FIG. 6D, at step 616, a client application connects to SDCDN communication network (e.g. control plane 140) and requests data content. At step 617, the SDCDN logic selects a first data source from the available CDNs. At step 618, the SDCDN logic sends control instructions to the client application via the control plane to connect to the selected first data source. Based on the control instructions, at step, 619, the client application establishes connection to the first data source and retrieves the data content. At step 620, the client application detects and reports under threshold performance during retrieval to SDCDN logic. At step 621, the SDCDN logic selects a second data source from the available CDNs. At step 622, SDCDN logic sends control instruction to the client application via the control plane to connect to the selected second data source. Based on the control instructions, at step 623, the client application establishes connection to the second data source and retrieves the content.

Figure 6E:
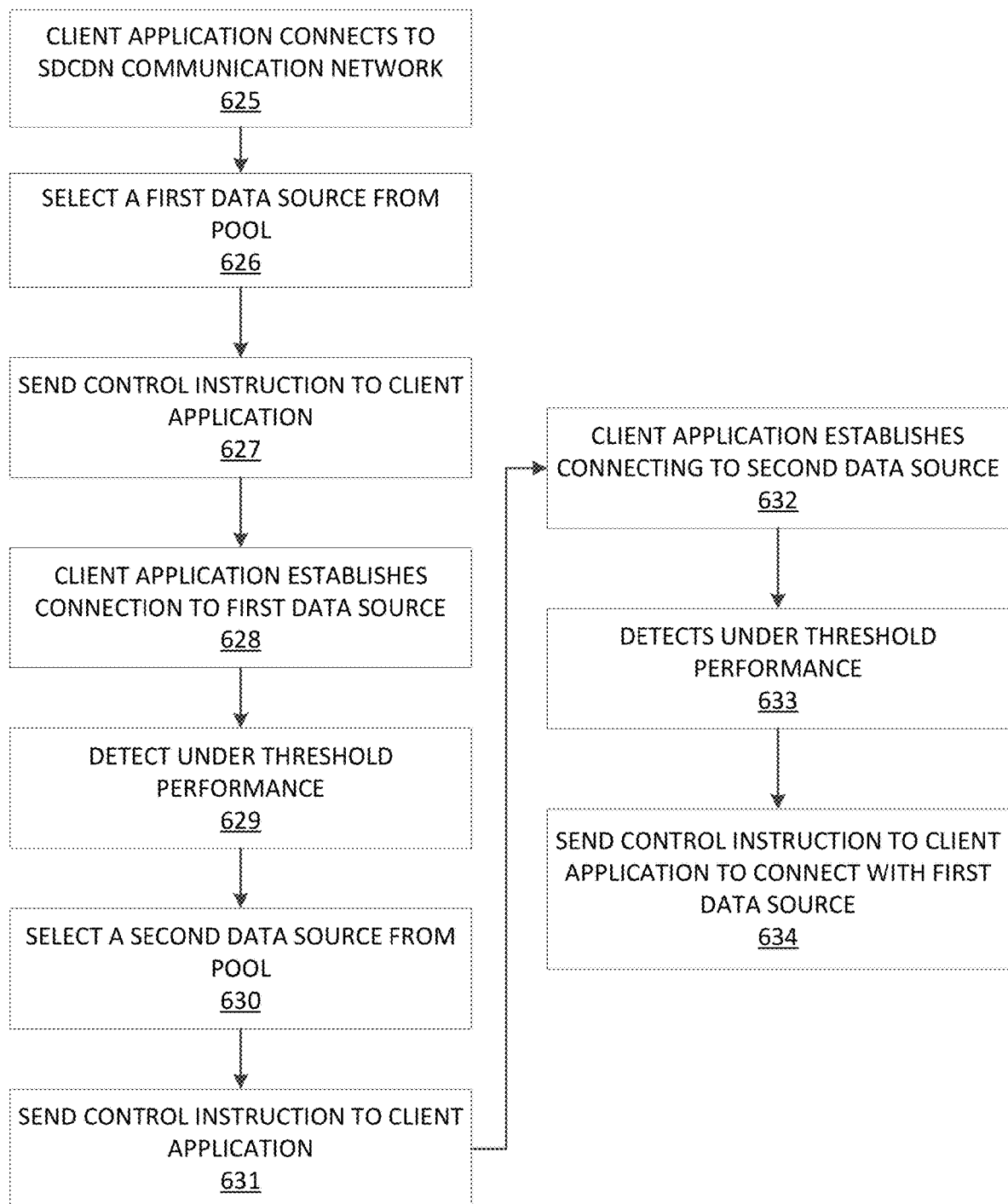
FIG. 6E illustrates an example method by which the present technology can be utilized when confronted with data content transfer issues outside the control of the SDCDN.

FIG. 6E illustrates an example method by which the present technology can be utilized when confronted with data content transfer issues outside the control of the SDCDN. The method could be carried out by any of the example system embodiments addressed above. For example, SDCDN layer 105 in FIG. 2 can include logic that includes pre-programmed delivery method(s), pre-programmed list of data source(s), and additional logic necessary to carry out this example method. The preprogrammed delivery method can include delivery quality thresholds (e.g. availability of data content, speed (bit/second), latency (ms), etc.), SDCDN logic 210 can utilize this data to determine when a number of data sources are under performing with a client application, and instruct a client application to switch back to the initial data source for a pre-programmed time before retrial when it is determined that the under performance is not attributable to any particular data source. The initial data source is the data source the client application initially established a connection with to retrieve data content. For instance, as illustrated in FIG. 6E, at step 625, a client application connects to SDCDN communication network (e.g. control plane 140) and requests data content. At step 626, the SDCDN logic selects a first data source from the available pool of data sources. At step 627, the SDCDN logic sends control instructions to the client application via the control plane to connect to the selected first data source. Based on the control instructions, at step, 628, the client application establishes connection to the first data source (data plane) and retrieves the data content. At step 629, the client application detects and reports under threshold performance during retrieval to SDCDN logic through control plane. At step 630, the SDCDN logic selects a different data source from the available pool. At step 631, SDCDN logic sends control instruction to the client application via the control plane to connect to the selected second data source. Based on the control instructions, at step 632, the client application establishes connection to the second data source and retrieves the content. However, at step 633, again, the client application detects and reports under threshold performance during retrieval of data content with the different data source to SDCDN logic. This process repeats and cycles through available pre-programmed data source until pre-set limit or all data sources are exhausted. Step 634, after the process either meets a pre-set limit or all data sources are exhausted, SDCDN logic sends control instruction to the client application to return to the first data source 635 for a pre-programmed time-barrier for retrial (after the time-barrier the cycle restarts).

Figure 6F:
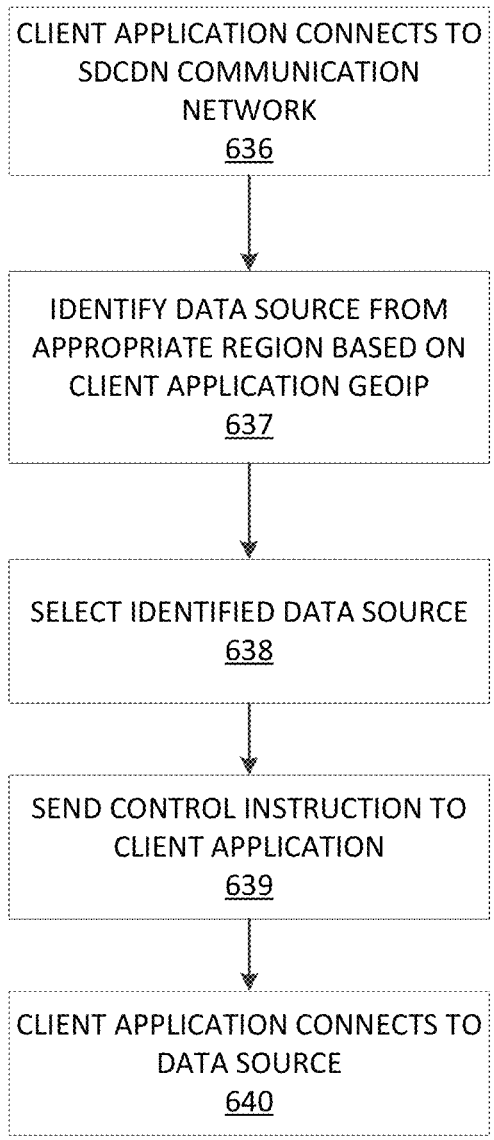
FIG. 6F illustrates an example method by which the present technology can be utilized to serve data based on region.

FIG. 6F illustrates an example method by which the present technology can be utilized to serve data based on region. The method could be carried out by any of the example system embodiments addressed above. For example, SDCDN layer 105 in FIG. 2 can include a database of pre-programmed regions and a preprogrammed delivery methods/data-sources associated with the pre-programmed regions. SDCDN logic 210 can utilize this data to determine the data source from a pool of data sources of a region associated with the client application, and instruct the client application to utilize the data source from the pool of data sources available from that particular region. For instance, as illustrated in FIG. 6F, at step 636, a client application connects to SDCDN communication network (e.g. control plane 140) and requests data content. At step 637, the SDCDN logic uses the source IP address of the client application, makes a geoIP lookup to identify the appropriate region of the client application. At step 638, the SDCDN selects a data source from the pool of data sources available for the particular region. At step 639, the SDCDN logic sends control instruction to the client application via the control plane to connect to the selected data source. Based on the control instructions, at step 640, the client application establishes connection to the data source (data plane) and retrieves the content from the data source (e.g. a $3^{rd}$ party CDN network).

Figure 6G:
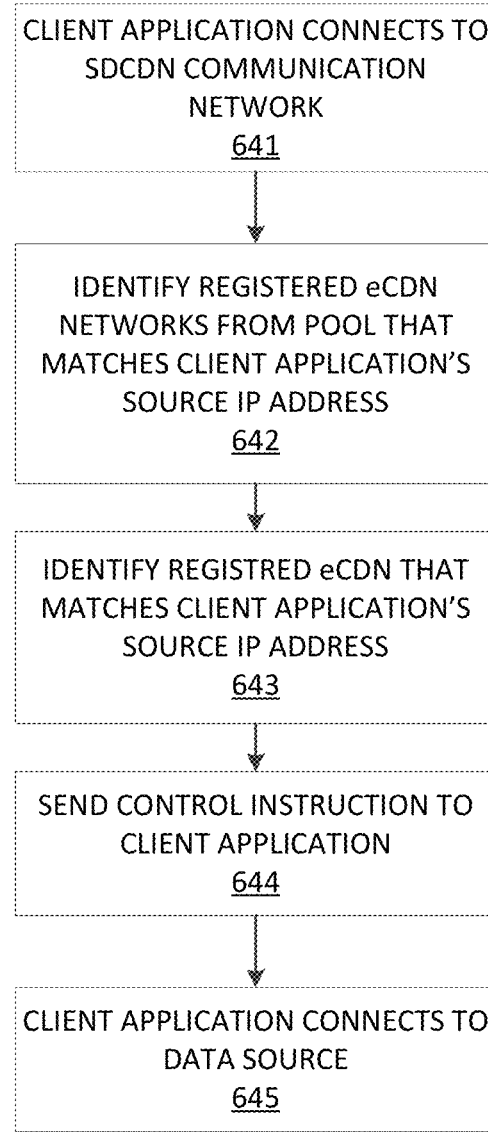
FIG. 6G illustrates an example method by which the present technology can be utilized to serve data from an eCDN.

FIG. 6G illustrates an example method by which the present technology can be utilized to prefer to serve data from an eCDN (Enterprise CDN). The method could be carried out by any of the example system embodiments addressed above. For example, SDCDN layer 105 in FIG. 2 can include an additional database of eCDN(s) deployed on a corporate network, registered eCDN(s) delivery method (s)/data sources, and associated pre-programmed IP addresses or subnets of the corporate network(s). SDCDN logic 210 can utilize this data to look up in the pre-programmed available pool of eCDN(s) to match a client application's IP address to any registered eCDN network(s), and instruct the client application to utilize a registered eCDN from those registered eCDN network(s). For instance, as illustrated in FIG. 6G, at step 641, a client application connects to SDCDN communication network (e.g. control plane 140) and requests data content. At step 642, the SDCDN logic uses the source IP address of the client application, makes a lookup in the pre-programmed available pool to match to any registered eCDN networks. At step 643, the SDCDN logic identifies the registered eCDN by the source IP address of the client application. At step 644, the SDCDN sends control instruction to the client application via the control plane to connect to the selected data source (eCDN). Based on the control instructions, at step 645, the client application establishes connection to the data source (data plane) and retrieves the content from the data source a $3^{rd}$ party CDN network).

Figure 6H:
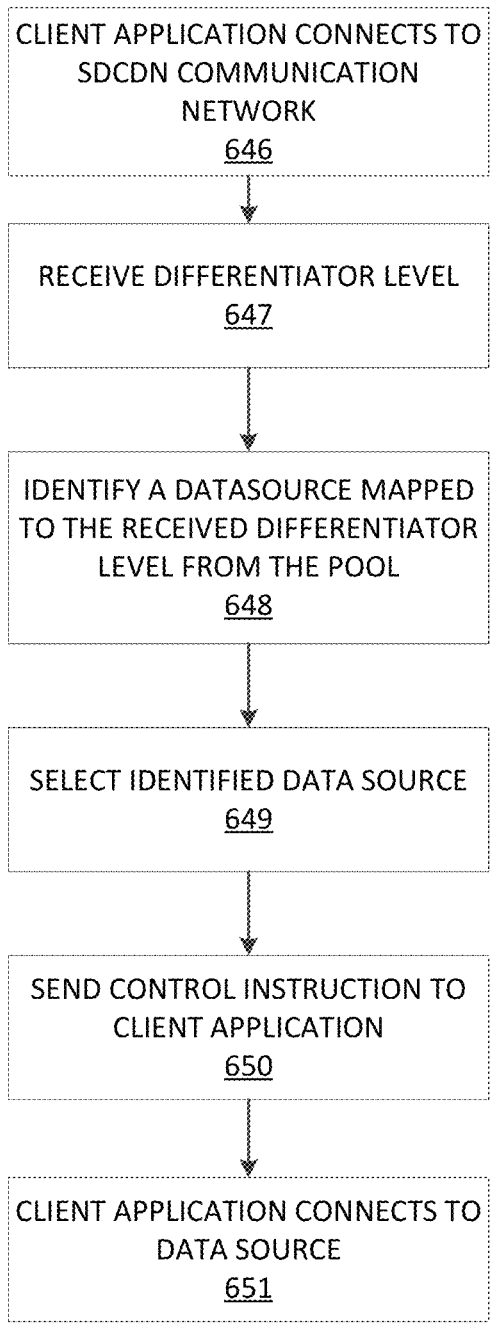
FIG. 6H illustrates an example method by which the present technology can be utilized to serve data based on subscription level and any other client based selection(s.

FIG. 6H illustrates an example method by which the present technology can be utilized to serve data based on a service level agreement or a client based requirement. The method could be carried out by any of the example system embodiments addressed above. For example, SDCDN layer 105 in FIG. 2 can include an additional database of pre-programmed client differentiator levels (e.g. subscription levels, etc.) and associated pre-programmed delivery method/data source per differentiator level of service level agreement. SDCDN logic 210 can utilize this data to look up in the pool of pre-programmed data sources mapped to a specific differentiator level, and instruct the client application to utilize a data source associated with that specific differentiator level. For instance, as illustrated in FIG. 6H, at step 646, a client application connects to SDCDN communication network (e.g. control plane 140) and requests data content. At step 647, the client application sends its differentiator level to SDCDN logic via control plane. At step 648, the SDCDN logic uses the received differentiator level to identify in the pool of pre-programmed data sources mapped to the specific differentiator level. At step 649, the SDCDN logic selects a data source mapped to the specific differentiator level. At step 650, the SDCDN sends control instruction to the client application via the control plane to connect to the selected data source. Based on the control instructions, at step 651, the client application establishes connection to the data source (data plane) and retrieves the content from the data source (e.g. a $3^{rd}$ party CDN network).

Figure 6I:
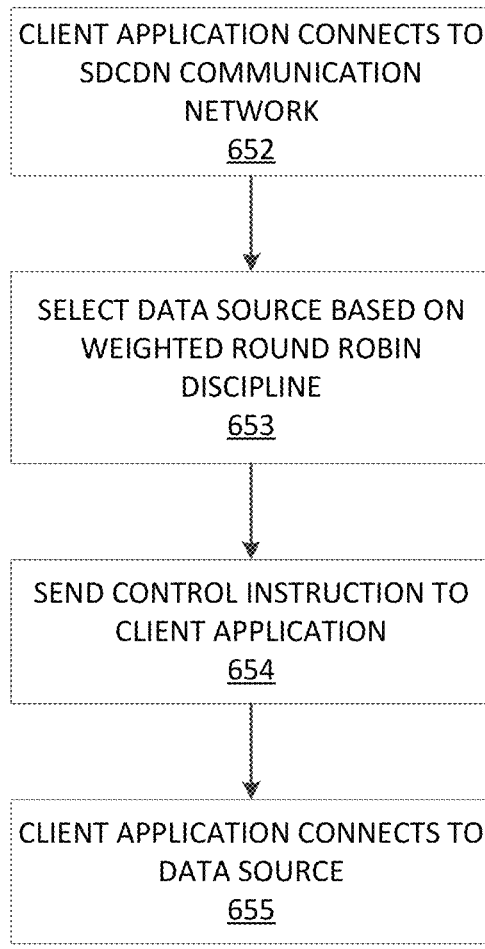
FIG. 6I illustrates an example method by which the present technology can be utilized to serve data based on the weighted round robin selection.

FIG. 6I illustrates an example method by which the present technology can be utilized to serve data based on the weighted round robin selection. The method could be carried out by any of the example system embodiments addressed above. For example, SDCDN layer 105 in FIG. 2 can include an additional database of pre-programmed client data sources with an associated weight for each pre-programmed client data source. SDCDN logic 210 can utilize this data to select a data source based on the weighted round robin discipline, and instruct the client application to utilize the selected data source. For instance, as illustrated in FIG. 6I, at step 652, a client application connects to SDCDN communication network (e.g. control plane 140) and requests data content. At step 653, the SDCDN logic uses weighted round robin discipline to select data source. At step 654, the SDCDN logic sends control instruction to the client application via the control plane to connect to the selected data source. Based on the control instructions, at step 655, the client application establishes connection to the data source (data plane) and retrieves the content from the data source (e.g. a $3^{rd}$ party CDN network).

Figure 6J:
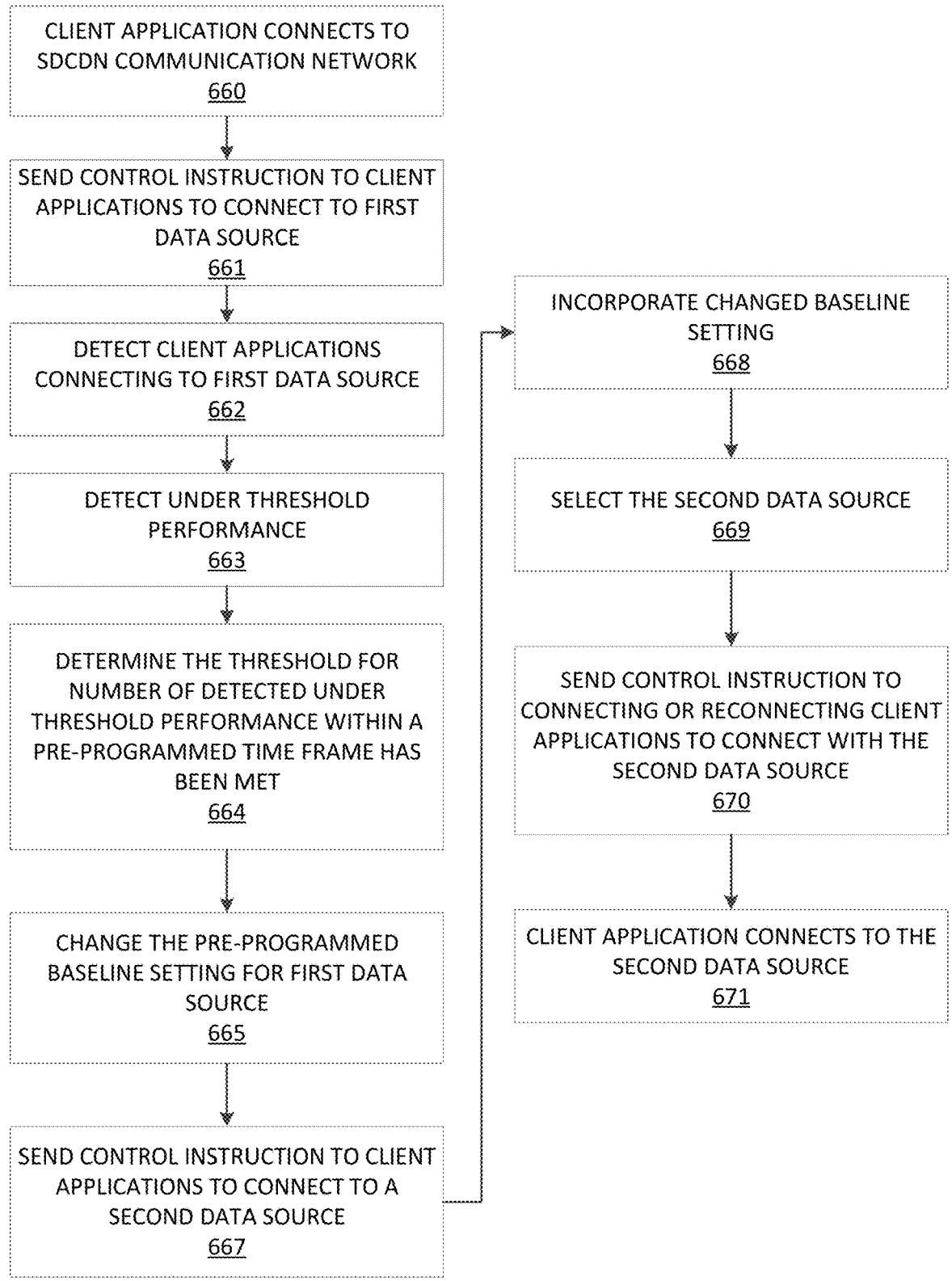
FIG. 6J illustrates an example method by which the present technology can be utilized to switch data sources in real time, based on changing network conditions; and A component or a feature that is common to more than one drawing is indicated with the same reference number in each of the drawings.

FIG. 6J illustrates an example method by which the present technology can be utilized to switch data sources, based on changing network conditions. The method could be carried out by any of the example system embodiments addressed above. For example, SDCDN layer 105 in FIG. 2 can include a database 225 of the number of connected and reporting client applications, various client applications connecting from the same network (e.g. autonomous system network), pre-programmed threshold of QoS affected client applications per data source, pre-programmed delivery quality thresholds (e.g. availability of data content, speed [bit per second], latency [ms], etc.), pre-programmed time interval between incoming reports, pre-programmed time-barrier for retrial of failing data source, and pre-programmed delivery method/data source. SDCDN logic 210 can utilize this data to switch data sources in real-time based on changing network conditions, and instruct the client application to utilize the next or different data source.

For instance, as illustrated in FIG. 6J, at step 660, various client applications connect to SDCDN communication network (e.g. control plane 140) from the same network (e.g. autonomous system network) and requests data content. At step 661, the SDCDN logic sends control instructions to the client applications via the control plane to connect to a first data source. At step, 662, the client applications establish connections to the data source (data plane) and retrieve the data content. At step 663, the client applications detect and report under delivery quality threshold performance during retrieval from the first data source to SDCDN logic (through control plane). At step 664, the SDCDN logic collects and registers the reports and determines if the reported amount of under delivery quality threshold reports arrive in a pre-programmed timeframe indicating that the first data source is not performing according to the predetermined quality threshold. At step 665, the SDCDN logic engages and changes the pre-programmed baseline setting (e.g. priority, weight, availability, etc.) for the first data source for a pre-programmed time-barrier for retrial of failing data source time frame. At step 667, all the client applications that reported the under delivery quality threshold performance of the first data source are then instructed by SDCDN logic to switch to a second data source. There could be client applications that are connected to the first data source from the particular autonomous system network and not reporting under quality threshold performance, and these client applications are not directed to the second data source.

For newly connecting or reconnecting client applications from the particular autonomous system network that is not reporting under quality threshold performance, at step 668, the SDCDN logic incorporates the changed baseline setting (e.g. priority, weight, availability, etc.) in data source selection until time-barrier is in effect. Due to the changing baseline settings, at step 669, the SDCDN selects the second data source as the data source to retrieve data content. At step 670, the SDCDN sends instructions, through the control plane, to client applications. Based on the instruction command, at step 671, the client applications establishes connection to the second data source (data plane) and retrieves the content.

In some embodiments, in the above example method for switching data sources in real time, based on changing network conditions, the data collected from that method is analyzed for recurring pattern recognition. If there is a recurring pattern over time (e.g. viewer number, time of day, time of week, etc.) baseline settings are or can be proactively changed to minimize client application impact. For example, in detecting the maximum number of client applications that can be served from a particular region by a particular data source and limiting new client applications to try a recurring bad QoS data source provider in a specific time, or above a certain concurrently connected client applications.

In some embodiments the SDCDN logic is connected to neural network, machine learning or deep learning systems. For instance, the data acquired from the SDCDN logic is delivered to machine learning for training and live retraining like the "feedforward" method, as well as traditional deep learning methods. Additionally, in some embodiments, the above described techniques are incorporated with the decisions produced machine learning or artificial intelligence systems in data source selection. For example, SDCDN layer 105 in FIG. 2 can include an additional database of decisions produced by a machine learning or artificial intelligence system.

As described above, the present disclosure opens access to CDN services for data content transfers, regardless of the geographical or logical location of the consumer of the data content, and whether the transfers will be through ISPs, cellular or other wireless network providers, or corporate/internal networks of enterprise companies. Additionally, the present disclosure also achieves redundancy in data content delivery anywhere on the globe, by enabling simple management of both regional and global CDN providers. Together, application providers other than the platform providers can use the present disclosure. Any application provider requiring the flexibility to create local caches for its applications can use the present disclosure to rely on a locally-available content and/or data aggregation and/or cache service deployed (whether on the application provider's premises, a third party's premises, or in the private or public cloud). Example applications that require flexibility to create local caches for its applications are those with high numbers of consumers, requiring large bandwidth, and/or with low-latency requirements are those that require such flexibility. Additionally, these applications call for the ability to aggregate data content from clients (such as desktop computers, tablets, phones, and other handhelds), to deliver data content to the clients from as close to using the otherwise best network for) the consumer of the data content as possible.

For example, using the techniques and processes of this disclosure, the following types of application providers can easily build services in different areas. For example, these techniques and processes of this disclosure can build services for videogame applications, especially those utilizing high-quality graphics, containing complex gameplay elements, or enabling sharing or other interactivity between users in different locations. In another example, these techniques and processes of this disclosure can build services for messaging applications, especially those transferring audio/visual content instead of or in addition to text data, or enabling sharing or other interactivity between users in different locations. In another example, these techniques and processes of this disclosure can build services for applications requiring transfers of both static and dynamic content, with static content being able to be cached on a server on premise or close to the user, or content being able to be pre-populated for display or transfer to the user upon first use of the application or pushed to the user at pre-determined points in the user's usage of the application.

The present disclosure also improves significantly or eliminates completely the negative effects to a user's experience caused by security layers in a data content transfer chain, such as VPN filtering, and/or time lags, quality changes, and temporary or permanent terminations in the content and/or data transfers resulting from use of a VPN, by enabling the transfer of content and/or data in encrypted form. Encrypted and unencrypted, sensitive and non-sensitive, static and dynamic content and/or data can be transferred via a CDN architecture employing a software layer above all CDNs, including CDNs which may even run on the home or hotel network itself. The user can use any authentication method required by the application provider to access the application itself and continue working where he/she left off. The present disclosure allows this process even with highly confidential or otherwise sensitive content and/or data to be transferred being encrypted at the origination point (such as the location where the enterprise hosts the application), and delivered in an encrypted format to the end user via CDN service (after which it can be then decrypted by using the key provided through either the VPN connection between the enterprise and the end user (client)) or via the control connection (140), or through standalone implementation, to ensure that only the end user (or only one specific user) can decrypt the content, because the SDCD techniques implement programmed and re-programmable logic to make decisions to maximize the quality of even content and/or data requiring higher bandwidth because of encryption while maintaining low latency to avoid interruptions in workflow by determining the ideal content and/or data transfer chain to be used.

While there have been shown and described illustrative embodiments that provide for improved content delivery using SDCDN, it is to be understood that various other adaptations and modifications may be made within the spirit and scope of the embodiments herein. For example, the embodiments have been shown and described herein with relation to a particular network configuration (e.g., with SDCDN between content providers and content delivery networks (CDNs); however, the embodiments in their broader sense are not as limited, and may, in fact, the techniques employed by the SDCDN can be employed at various other network locations, and incorporated into other network devices.

While some embodiments herein have referred to a limited number of data sources or content delivery networks, persons of ordinary skill in the art will recognize this is just for convenience of illustration and the present technology can work with any number of data sources provided by any number of content delivery networks. Further while reference is sometimes made to different data sources, persons of ordinary skill in the art will recognize that those data sources may be part of different content delivery networks, and as such switch data sources can also include retrieving data from a different content delivery networks. Additionally, while in some embodiments the Software Defined Content Delivery Network (SDCDN) may be illustrated as a particular device, persons of ordinary skill in the art will appreciate that this is just for illustrative convenience and that the SDCDN is a logical orchestration layer that may be instantiated and embodied by any type of software deployment methods (e.g. one or more physical or virtual machines, containers, etc.) on one or more servers in one or more data centers Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible non-transitory computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state info kation of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagram, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a. computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart, and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program instructions stored therein, said program instructions executable by one or more processors of a computer system to implement the methods of the present invention.

A computer system of the present invention comprises one or more processors, one or more memories, and one or more computer readable hardware storage devices, said one or more hardware storage device containing program instructions executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for delivering data content in a communication network, said method comprising:
monitoring, by a software defined content delivery network (SDCDN), one or more performance indicators regarding an exchange of the data content between a first content delivery network (CDN) of a plurality of CDNs and at least one client device of one or more client devices using a communication channel configured for communication, within the communication network, between the SDCDN and the one or more client devices, said first CDN including the data content, said SDCDN being above the CDNs as a logical orchestration layer that directly communicates with each CDN; said SDCDN configured to communicate directly with each client device using a communication channel having a bi-directional connection between SDCDN and the client device, said bidirectional channel being separate from a content data stream and allowing an exchange of operational or performance data and control messages between each client device and the SDCDN;
associating, by the SDCDN, one metric of a plurality of metrics with at least one performance indicator, of one or more performance indicators, relating to the exchange of the data content between the first CDN and the at least one client device, wherein each metric of the plurality of metrics relates to the exchange of the data content between a respective CDN of the plurality of CDNs and the at least one client device;
determining, by the SDCDN, that at the least one performance indicator exceeds a threshold performance value for the first CDN, and in response,
selecting, by the SDCDN, a different CDN, of the plurality of CDNs, that the client device should switch to, said different CDN being in operative communication with the at least one client device, said different CDN including the data content, said selecting the different CDN comprising using, by the SDCDN, the one metric associated with the at least one performance indicator to determine an optimal CDN of the plurality of CDNs to select as the different CDN that the client device should switch to; and
transmitting, by the SDCDN, a transfer command to the at least one client device to cause the at least one client device to switch to the different CDN and receive the data content from the different CDN.

2. The method of claim 1, wherein the at least one performance indicator is a cost.

3. The method of claim 1, wherein the different CDN is a second CDN, and wherein the method further comprises:
monitoring, by the SDCDN, the one or more performance indicators regarding an exchange of the data content between the second CDN and the at least one client device using the communication channel;
identifying, by the SDCDN, a third CDN in operative communication with the at least one client device, the third CDN including the data content;
in response to said determining that at least one performance indicator of the one or more performance indicators exceeds the threshold performance value for the second CDN, transmitting, by the SDCDN, a transfer command to the at least one client device to cause the at least one client device to switch to the third CDN and receive the data content from the third CDN;
monitoring, by the SDCDN, the one or more performance indicators regarding an exchange of the data content between the third CDN and the at least one client device using the communication channel;
in response to said determining that at least one performance indicator of the one or more performance indicators exceeds the threshold performance value for the third CDN, determining, by the SDCDN, that an issue exists in the communication network proximate to the at least one client device relating to the exchange of the data content between the at least one client device and each CDN of the first CDN, the second CDN, and the third CDN; and
transmitting, by the SDCDN, a transfer command to the at least one client device responsive to the issue to cause the at least one client device to switch to the first CDN and receive the data content from the first CDN.

4. The method of claim 1, wherein the SDCDN is configured to use software defined content delivery (SDCD) techniques to: optimize an exchange of data content between the CDNs and corresponding client devices, enable a particular client device to use different CDN service providers based on best delivery capabilities in different geographical regions, provide CDN redundancy when a particular CDN is unavailable to the corresponding client device, receive telemetry data from each client and based on such telemetry data, implement programmed and re-programmable logic to make decisions to maximize a quality of the content and/or data transfers for as many consumers as possible and/or to maximize a volume of the content and/or data transfers, and identify in real-time a popularity of data content and based on the popularity of the data content whether a given CDN would suffice.

5. The method of claim 1, wherein the communication channel is defined through at least one content delivery network (CDN) the plurality of CDNs, at least one point of presence (PoP) server, and at least one client device via a foreign network.

6. The method of claim 1, wherein messages are exchanged between the one or more client devices and the SDCDN using the communication channel according to at least one protocol of a real time messaging protocol (RTMP), a real time streaming protocol (RTSP), a hypertext transfer protocol (HTTP), Domain Name System (DNS) and WebSocket protocol.

7. A software defined content delivery network (SDCDN) device, said SDCDN device comprising: a processor configured to execute a method for delivering data content in a communication network; and a memory configured to store the method executable by the processor, said method comprising:
monitoring, by the SDCDN, one or more performance indicators relating to an exchange of the data content between a first content delivery network (CDN) of a plurality of CDNs and at least one client device of one or more client devices using a communication channel configured for communication, within the communication network, between the SDCDN and the one or more client devices, said first CDN including the data content, said SDCDN being above the CDNs as a logical orchestration layer that directly communicates with each CDN; said SDCDN configured to communicate directly with each client device using a communication channel having a bi-directional connection between SDCDN and the client device, said bidirectional channel being separate from a content data stream and allowing an exchange of operational or performance data and control messages between each client device and the SDCDN;

associating, by the SDCDN, one metric of a plurality of metrics with at least one performance indicator, of one or more performance indicators, relating to the exchange of the data content between the first CDN and the at least one client device, wherein each metric of the plurality of metrics relates to the exchange of the data content between a respective CDN of the plurality of CDNs and the at least one client device;

determining, by the SDCDN, that at the least one performance indicator exceeds a threshold performance value for the first CDN, and in response, selecting, by the SDCDN, a different CDN, of the plurality of CDNs, that the client device should switch to, said different CDN being in operative communication with the at least one client device, said different CDN including the data content, said selecting the different CDN comprising using, by the SDCDN, the one metric associated with the at least one performance indicator to determine an optimal CDN of the plurality of CDNs to select as the different CDN that the client device should switch to; and transmitting, by the SDCDN, a transfer command to the at least one client device to cause the at least one client device to switch to the different CDN and receive the data content from the different CDN.

8. The SDCDN device of claim 7, wherein the at least one performance indicator is a cost.

9. The SDCDN device of claim 7, wherein the different CDN is a second CDN, and wherein the method further comprises:

monitoring, by the SDCDN, the one or more performance indicators regarding an exchange of the data content between the second CDN and the at least one client device using the communication channel;

identifying, by the SDCDN, a third CDN in operative communication with the at least one client device, the third CDN including the data content;

in response to said determining that at least one performance indicator of the one or more performance indicators exceeds the threshold performance value for the second CDN, transmitting, by the SDCDN, a transfer command to the at least one client device to cause the at least one client device to switch to the third CDN and receive the data content from the third CDN;

monitoring, by the SDCDN, the one or more performance indicators regarding an exchange of the data content between the third CDN and the at least one client device using the communication channel;

in response to said determining that at least one performance indicator of the one or more performance indicators exceeds the threshold performance value for the third CDN, determining, by the SDCDN, an issue exists in the communication network proximate to the at least one client device relating to the exchange of the data content between the at least one client device and each CDN of the first CDN, the second CDN, and the third CDN; and transmitting, by the SDCDN, a transfer command to the at least one client device responsive to the issue to cause the at least one client device to switch to the first CDN and receive the data content from the first CDN.

10. The software defined content delivery network (SDCDN) device of claim 7, wherein the SDCDN is configured to use software defined content delivery (SDCD) techniques to: optimize an exchange of data content between the CDNs and corresponding client devices, enable a particular client device to use different CDN service providers based on best delivery capabilities in different geographical regions, provide CDN redundancy when a particular CDN is unavailable to the corresponding client device, receive telemetry data from each client and based on such telemetry data, implement programmed and re-programmable logic to make decisions to maximize a quality of the content and/or data transfers for as many consumers as possible and/or to maximize a volume of the content and/or data transfers, and identify in real-time a popularity of data content and based on the popularity of the data content whether a given CDN would suffice.

11. The SDCDN device of claim 7, wherein the communication channel is defined through at least one content delivery network (CDN), at least one point of presence (PoP) server, and at least one client device.

12. The SDCDN device of claim 7, wherein messages are exchanged between the one or more client devices and the SDCDN using the communication channel according to at least one protocol of a real time messaging protocol (RTMP), a real time streaming protocol (RTSP), a hypertext transfer protocol (HTTP), Domain Name System (DNS) and WebSocket protocol.

13. A non-transitory computer readable medium containing instructions executable by a software defined content delivery network (SDCDN) device to implement a method for delivering data content in a communication network, said method comprising:

monitoring, by the SDCDN, one or more performance indicators relating to an exchange of the data content between a first content delivery network (CDN) of a plurality of CDNs and at least one client device of one or more client devices using a communication channel configured for communication, within the communication network, between the SDCDN and the one or more client devices, said first CDN including the data content, said SDCDN being above the CDNs as a logical orchestration layer that directly communicates with each CDN; said SDCDN configured to communicate directly with each client device using a communication channel having a bi-directional connection between SDCDN and the client device, said bidirectional channel being separate from a content data stream and allowing an exchange of operational or performance data and control messages between each client device and the SDCDN;

associating, by the SDCDN, one metric of a plurality of metrics with at least one performance indicator, of one or more performance indicators, relating to the exchange of the data content between the first CDN and the at least one client device, wherein each metric of the plurality of metrics relates to the exchange of the data content between a respective CDN of the plurality of CDNs and the at least one client device;

determining, by the SDCDN, that at the least one performance indicator exceeds a threshold performance value for the first CDN, and in response, selecting, by the SDCDN, a different CDN, of the plurality of CDNs, that the client device should switch to, said different CDN being in operative communication with the at least one client device, said different CDN including the data content, said selecting the different CDN comprising using, by the SDCDN, the one metric associated with the at least one performance indicator to determine an optimal CDN of the plurality of CDNs to select as the different CDN that the client device should switch to; and transmitting, by the SDCDN, a transfer command to the at least one client device to cause the at least one client device to switch to the different CDN and receive the data content from the different CDN.

14. The non-transitory computer readable medium of claim 13, wherein the at least one performance indicator is a cost.

15. The non-transitory computer readable medium of claim 13, wherein the different CDN is a second CDN, and wherein the method further comprises:

monitoring, by the SDCDN, the one or more performance indicators regarding an exchange of the data content between the second CDN and the at least one client device using the communication channel;

identifying, by the SDCDN, a third CDN in operative communication with the at least one client device, the third CDN including the data content;

in response to said determining that at least one performance indicator of the one or more performance indicators exceeds the threshold performance value for the second CDN, transmitting, by the SDCDN, a transfer command to the at least one client device to cause the at least one client device to switch to the third CDN and receive the data content from the third CDN;

monitoring, by the SDCDN, the one or more performance indicators regarding an exchange of the data content between the third CDN and the at least one client device using the communication channel;

in response to said determining that at least one performance indicator of the one or more performance indicators exceeds the threshold performance value for the third CDN, determining, by the SDCDN, an issue exists in the communication network proximate to the at least one client device relating to the exchange of the data content between the at least one client device and each CDN of the first CDN, the second CDN, and the third CDN; and transmitting, by the SDCDN, a transfer command to the at least one client device responsive to the issue to cause the at least one client device to switch to the first CDN and receive the data content from the first CDN.

16. The non-transitory computer readable medium of claim 13, wherein the SDCDN is configured to use software defined content delivery (SDCD) techniques to: optimize an exchange of data content between the CDNs and corresponding client devices, enable a particular client device to use different CDN service providers based on best delivery capabilities in different geographical regions, provide CDN redundancy when a particular CDN is unavailable to the corresponding client device, receive telemetry data from each client and based on such telemetry data, implement programmed and re-programmable logic to make decisions to maximize a quality of the content and/or data transfers for as many consumers as possible and/or to maximize a volume of the content and/or data transfers, and identify in real-time a popularity of data content and based on the popularity of the data content whether a given CDN would suffice.

17. The non-transitory computer readable medium of claim 13, wherein the communication channel is defined through at least one content delivery network (CDN), at least one point of presence (PoP) server, and at least one client device.

* * * * *

UNITED STATES PATENT AND TRADEMARK OFFICE
CERTIFICATE OF CORRECTION

PATENT NO. : 10,686,860 B2  
APPLICATION NO. : 15/525752  
DATED : June 16, 2020  
INVENTOR(S) : Feher et al.

Page 1 of 1

It is certified that error appears in the above-identified patent and that said Letters Patent is hereby corrected as shown below:

On the Title Page

Item (73), please add Assignee:  
"INTERNATIONAL BUSINESS MACHINES CORPORATION"

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*